(12) United States Patent
Shimosato

(10) Patent No.: US 8,068,813 B2
(45) Date of Patent: Nov. 29, 2011

(54) COMMUNICATION APPARATUS AND COMMUNICATION METHOD CAPABLE OF WIRED AND WIRELESS COMMUNICATION

(75) Inventor: Jiro Shimosato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 11/559,156

(22) Filed: Nov. 13, 2006

(65) Prior Publication Data

US 2007/0120955 A1    May 31, 2007

(30) Foreign Application Priority Data

Nov. 18, 2005    (JP) ................. 2005-334316
Apr. 28, 2006    (JP) ................. 2006-125016

(51) Int. Cl.
*H04L 12/56* (2006.01)
(52) U.S. Cl. ............... 455/412.1; 348/14.01; 375/E7.09
(58) Field of Classification Search .................. 271/713; 375/228, 341, E1; 455/412, 424, 445; 343/795, 343/702, 817, 818; 345/173; 713/169
See application file for complete search history.

(56) References Cited

U.S. PATENT DOCUMENTS

| | | | |
|---|---|---|---|
| 7,085,814 B1 * | 8/2006 | Gandhi et al. ................. | 709/208 |
| 2002/0038400 A1 * | 3/2002 | Fukushima .................. | 710/300 |
| 2003/0142631 A1 * | 7/2003 | Silvester ...................... | 370/252 |
| 2004/0180649 A1 * | 9/2004 | Vogel et al. .................... | 455/418 |
| 2004/0192405 A1 * | 9/2004 | Van Bosch ................. | 455/569.1 |
| 2004/0198430 A1 * | 10/2004 | Moriyama et al. .......... | 455/556.1 |
| 2004/0263914 A1 * | 12/2004 | Yule et al. ..................... | 358/402 |
| 2005/0259945 A1 * | 11/2005 | Splaver .............................. | 386/4 |
| 2005/0265345 A1 * | 12/2005 | Chen et al. .................... | 370/392 |
| 2006/0009213 A1 * | 1/2006 | Sturniolo et al. ........... | 455/426.1 |
| 2006/0025132 A1 * | 2/2006 | Karaoguz et al. ............ | 455/433 |
| 2006/0045040 A1 * | 3/2006 | Tian et al. ..................... | 370/321 |
| 2006/0073852 A1 * | 4/2006 | Li ................................ | 455/566 |
| 2006/0239208 A1 * | 10/2006 | Roberts et al. ................ | 370/254 |
| 2006/0287001 A1 * | 12/2006 | Budampati et al. ......... | 455/552.1 |

FOREIGN PATENT DOCUMENTS

| | | |
|---|---|---|
| CN | 02249295 | 5/2002 |
| EP | 1564931 A1 | 8/2005 |

* cited by examiner

*Primary Examiner* — Nick Corsaro
*Assistant Examiner* — Mahendra Patel
(74) *Attorney, Agent, or Firm* — Canon U.S.A., Inc. IP Division

(57) ABSTRACT

In a parameter setting method, when a wireless communication device has wired connection to a different device, the wired connection is used to acquire wireless setting values. If the wireless communication device has no wired connection to the different device, short distance wireless communication is used to acquire the wireless setting values from the different device. When the wireless setting values are acquired, notifying to the user is performed depending on an acquisition method.

7 Claims, 20 Drawing Sheets

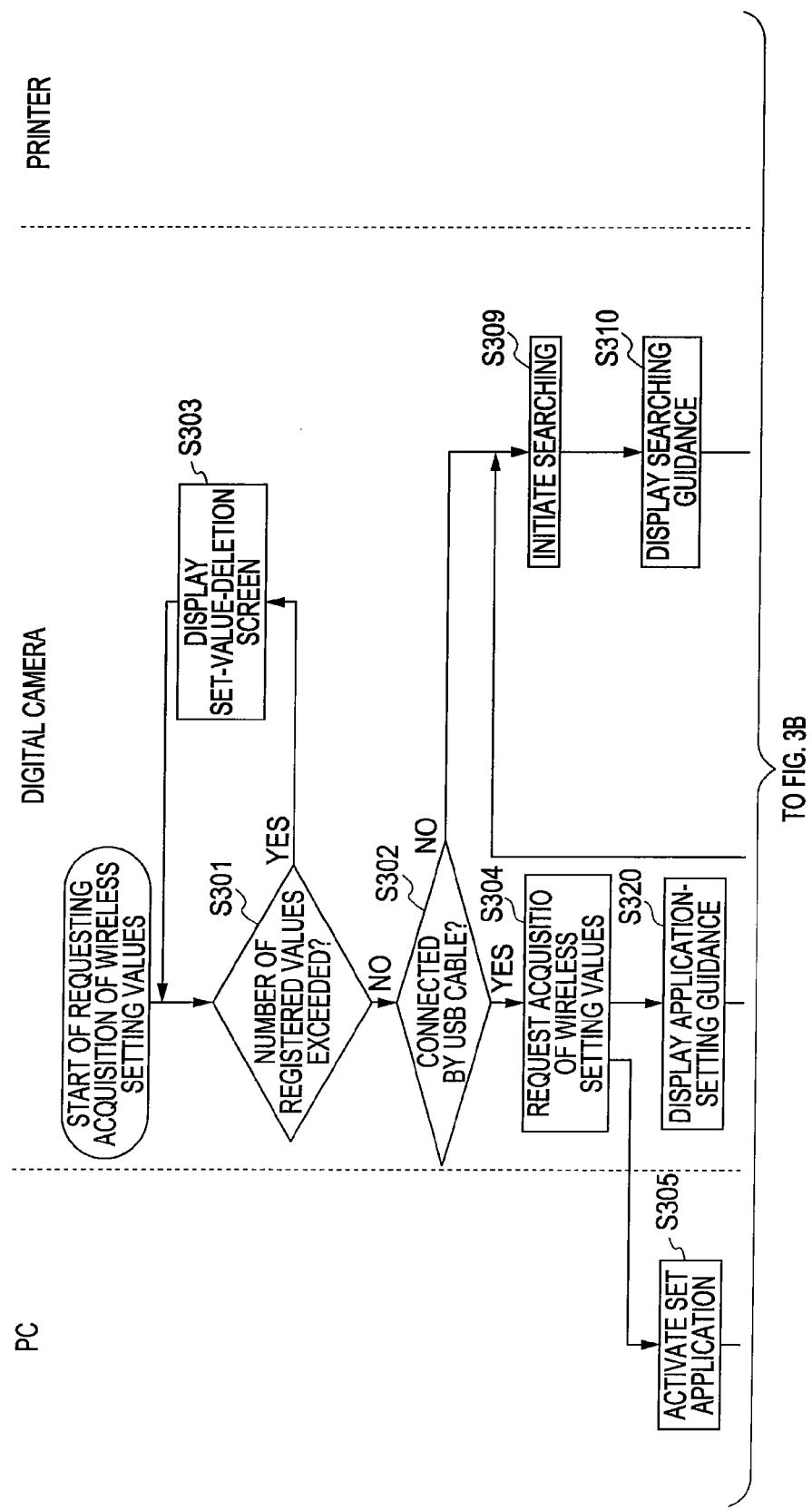

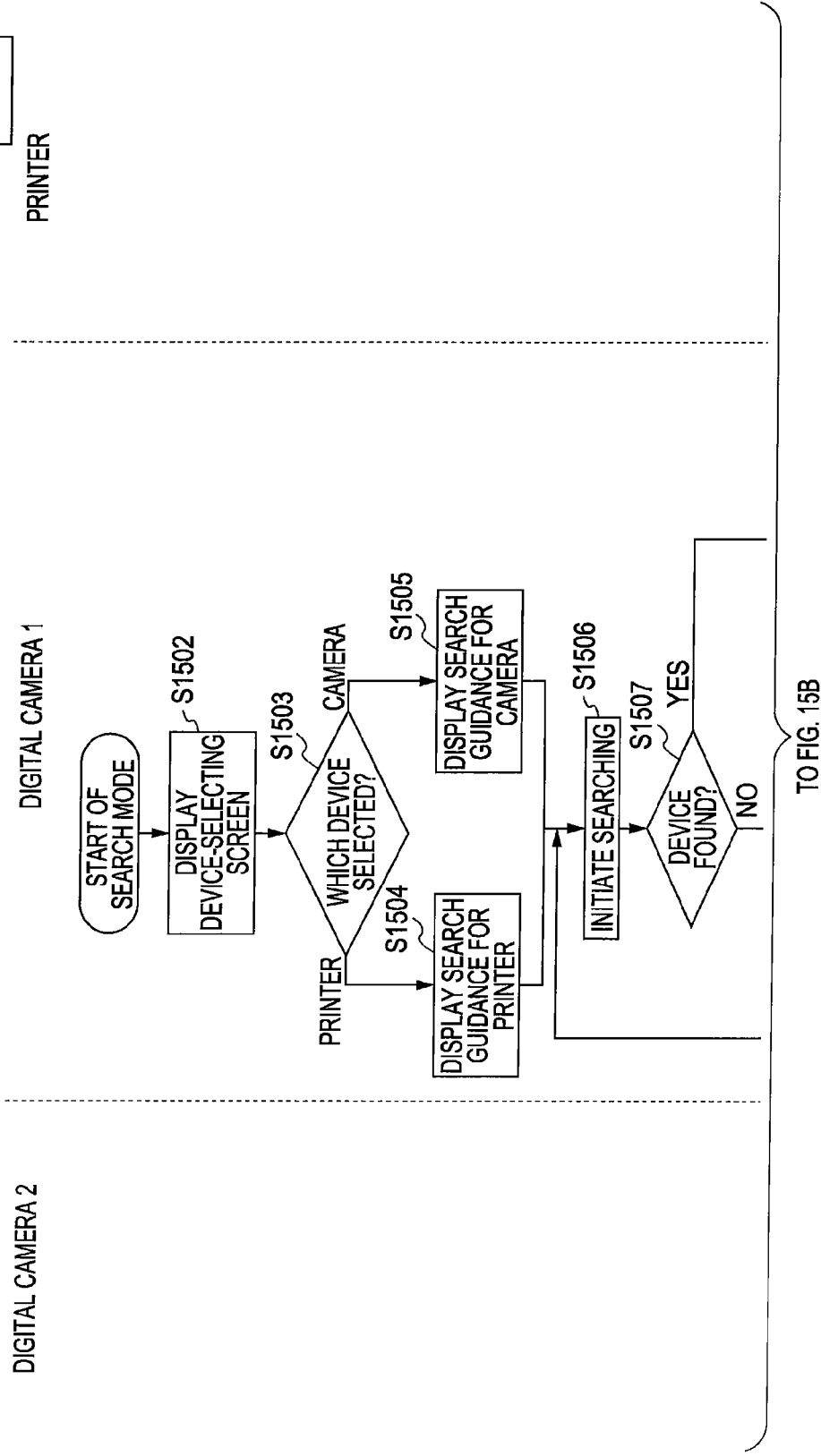

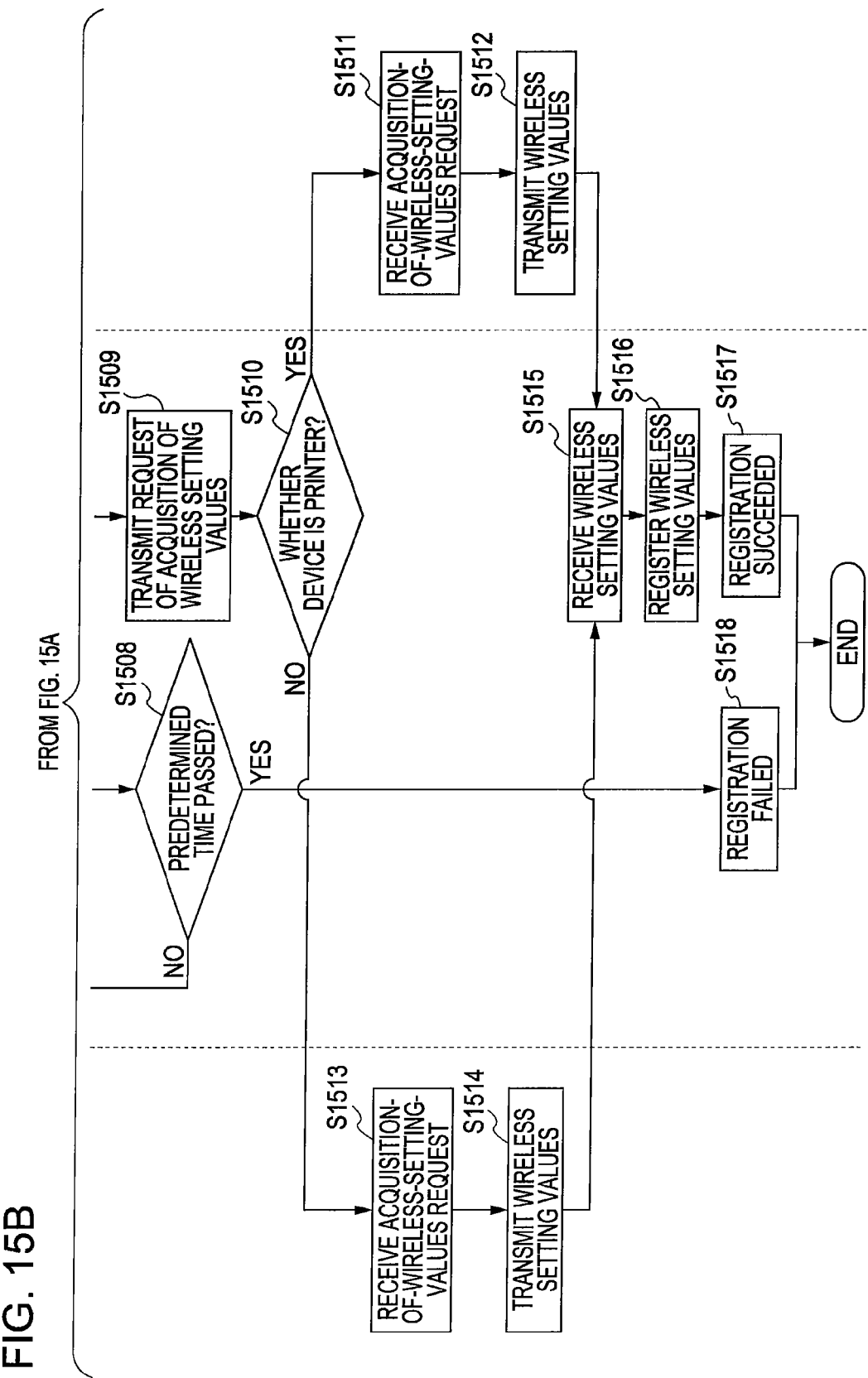

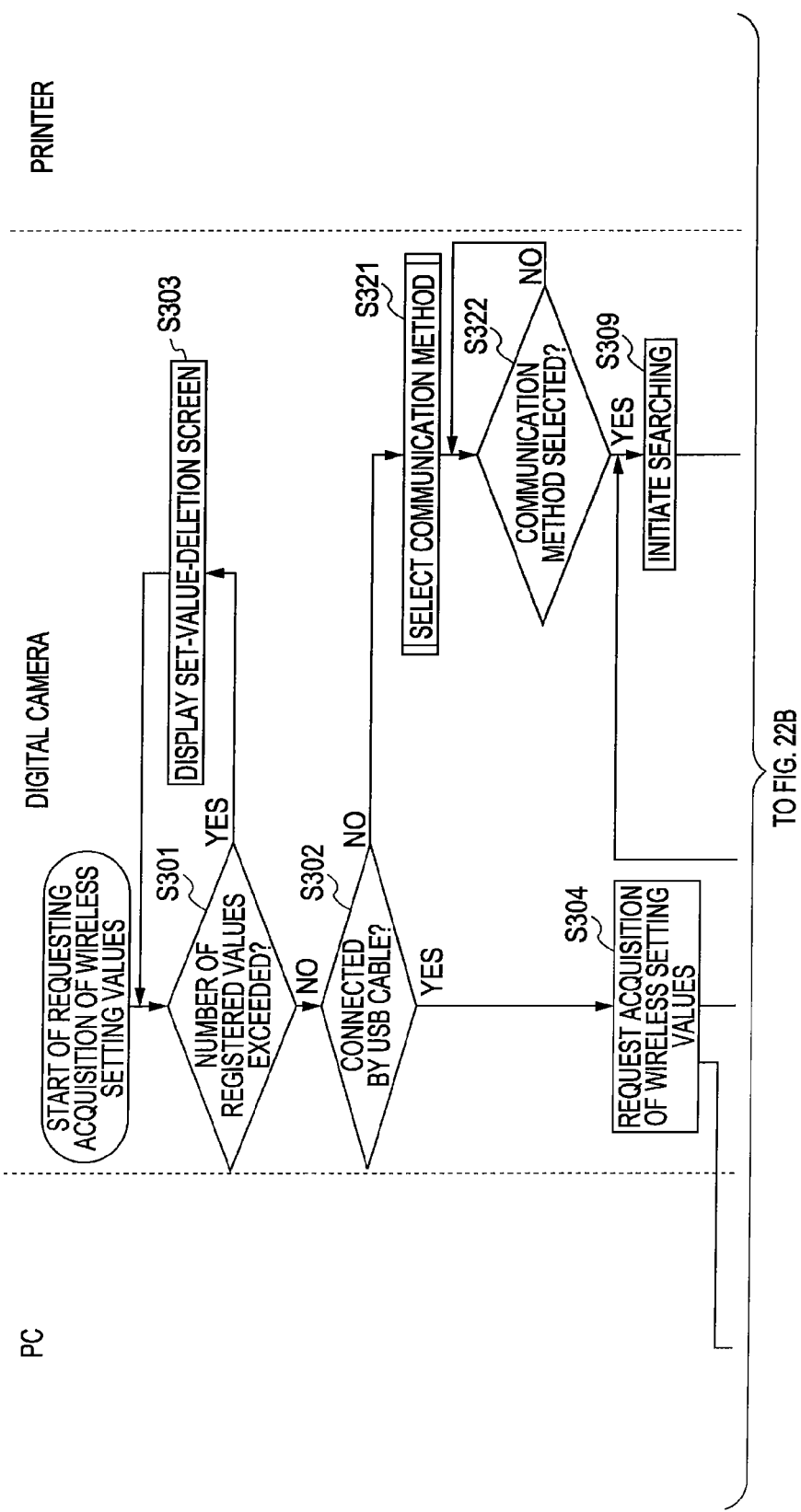

COMMUNICATION APPARATUS AND COMMUNICATION METHOD CAPABLE OF WIRED AND WIRELESS COMMUNICATION

BACKGROUND OF THE INVENTION

1. Field of the Invention

The present invention relates to a technology by which, among computer devices for use in a wireless network such as a wireless LAN (local area network), even a computer device that only has limited operating units can easily configure various types of settings for connecting to the wireless LAN.

2. Description of the Related Art

In recent years, wireless LANs that use wireless communication to connect devices, such as personal computers and digital cameras, have been in widespread use. In order for each device to access a wireless LAN network, for the device, it is necessary to configure wireless LAN settings such as a communication mode (ad hoc mode/infrastructure mode), a communication channel, an extended service set identifier (ESS-ID), and a wired equivalent privacy key (WEP key).

However, when using a portable apparatus such as a digital camera, it is very cumbersome to input the above setting values since such a portable apparatus has limited operating units.

Accordingly, a method in which the above setting values are input by a device such as a personal computer having various input units and are transmitted to a portable apparatus by wired communication has been proposed. In addition, a secure method for transmitting the above setting values to a portable apparatus by short distance wireless communication has also been proposed.

In addition, portable apparatuses in recent years include a type of device having both a wired connection interface and a wireless connection interface for establishing connection to external devices. When settings for connecting to the wireless LAN are configured by using such a type of device, either of the above two methods can be used.

Accordingly, when a portable apparatus requests acquisition of wireless setting values, it is desirable that the portable apparatus automatically select and execute a method for the acquisition depending on the status of the portable apparatus at the time.

In general, when the above two methods for setting value acquisition differ in process, a user who configures the settings by using a method different from that at the previous time may be confused. Thus, usability needs to be improved.

SUMMARY OF THE INVENTION

The present invention has been made in view of the above circumstances. The present invention provides a setting method for allowing a user to smoothly configure wireless connection settings.

It is a feature of the present invention to solve the conventional problems. According to an aspect of the present invention, a communication apparatus capable of communicating with an external device by using a wired communicating unit or a wireless communicating unit includes: a first determination unit configured to determine whether the communication apparatus is connected to the external device via a cable; a first acquisition unit configured to acquire parameters for wireless communication with the external device from the external device by wired communication, when the first determination unit determines that the communication apparatus is connected to the external device via the cable; a search unit configured to search for the external device by wireless communication, when the first determination unit determines that the communication apparatus is not connected to the external device via the cable; a second acquisition unit configured to acquire parameters for wireless communication from the searched external device; and a notifying unit configured to notify of a communication state in a different form based on the result of determination by the first determination unit.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIGS. 3A and 3B are flowcharts showing a process of requesting acquisition of wireless setting values in a first exemplary embodiment of the present invention.

FIGS. 15A and 15B are flowcharts showing a wireless search mode in a third exemplary embodiment of the present invention.

FIGS. 22A and 22B are flowcharts showing a process of requesting acquisition of wireless setting values in a fourth embodiment of the present invention.

DESCRIPTION OF THE EMBODIMENTS

Exemplary embodiments of the present invention are described with reference to the accompanying drawings. Each embodiment described below will be useful for understanding various concepts such as generic concepts, specific concepts, and more specific concepts of the present invention. A technical scope of the present invention is defined by the appended claims, and is not limited by each embodiment described below. All combinations of features described in the following embodiments are not always essential for solutions in the present invention.

First Exemplary Embodiment

A first exemplary embodiment of the present invention in which a personal computer or a printer is used as a device from which wireless setting values are acquired and a digital camera is used as a portable apparatus is illustrated below.

Figure 20:
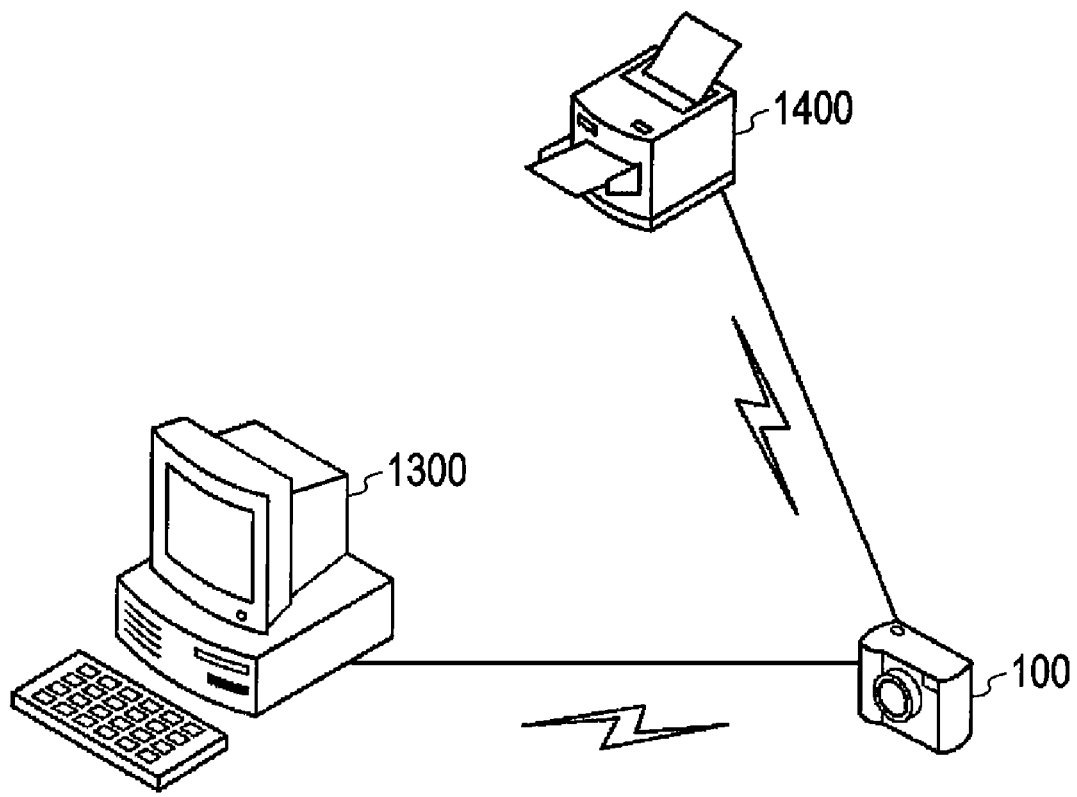
FIG. 20 is an illustration of the configuration of a system according to the first embodiment of the present invention.

FIG. 20 illustrates an exemplary configuration of a system according to the first embodiment. A digital camera 100 is connected to a personal computer (PC) 1300 and a printer 1400, and they can communicate with one another. Either wired connection or wireless connection is usable as connection among them, and can be arbitrarily selected by a user.

Figure 1:
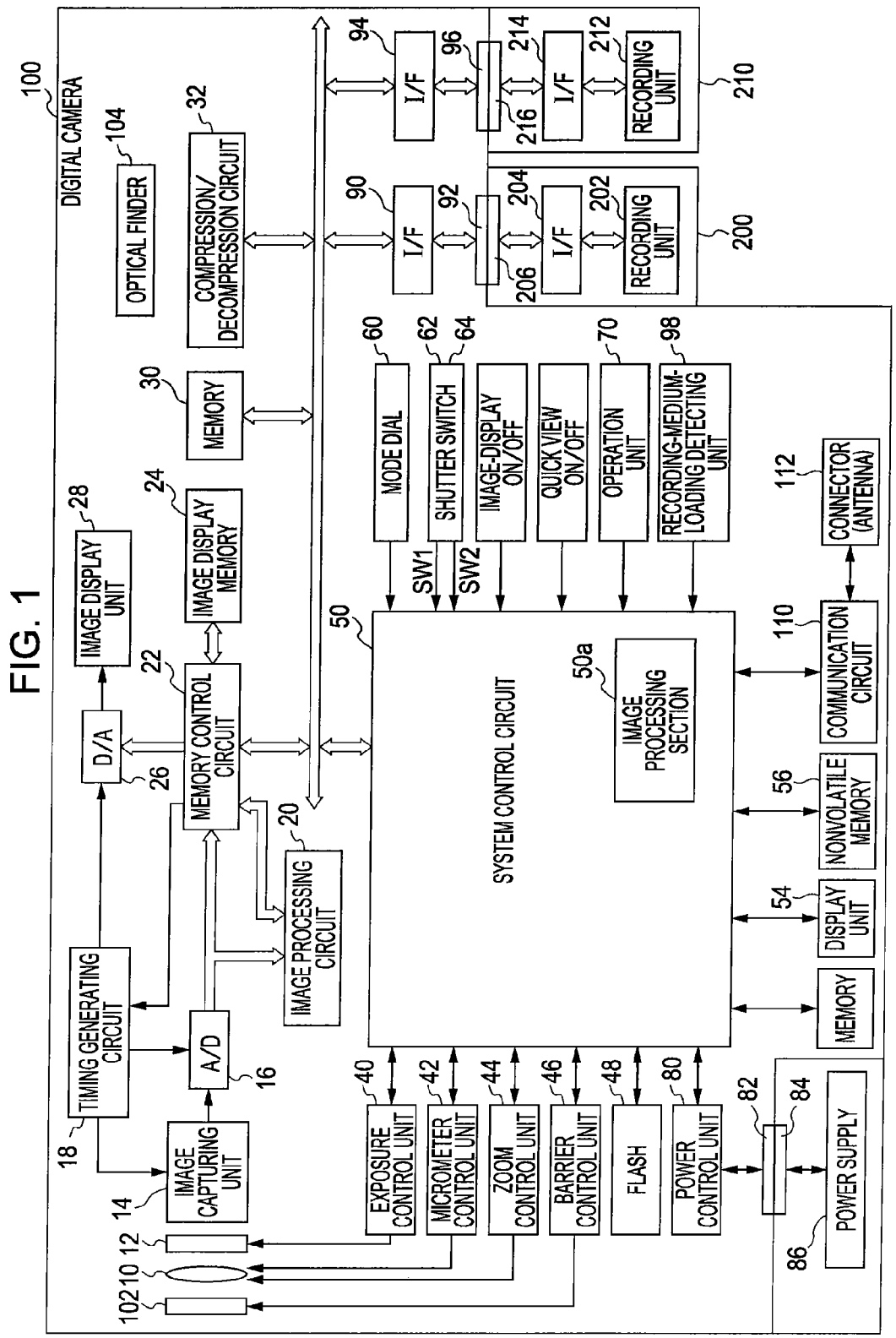
Fig. 1 is a block diagram showing an example of a hardware configuration of a digital camera.

FIG. 1 illustrates an example of the digital camera 100.

The digital camera 100 can capture images of a subject through an optical system (image capturing lens unit) 10.

The optical system 10 can be formed by a zoom lens (lens unit in which an angle of view for image capture is changeable). This provides an optical zoom function ("optical zoom").

The digital camera 100 can have an electronic zoom function ("electronic zoom") that performs zooming by electronically trimming an image captured by an image capturing unit 14. The digital camera 100 may have only one of the optical zoom function and the electronic zoom function.

The optical system 10 may be replaceable. In this case, in the digital camera 100, an electric signal is sent to the optical system 10, and the zoom function may be provided such that a driving mechanism in the optical system 10 drives a vari-focus lens unit. In addition, in the digital camera 100, a driving mechanism for mechanically driving the vari-focus lens unit of the optical system 10 may be provided.

Rays of light (incident at an optical angle of view) that pass through the optical system 10 (the image capturing lens) form an optical image of the subject onto an imaging area of the image capturing unit 14 (for example, a charge-coupled device (CCD) sensor or a complementary metal-oxide semiconductor (CMOS) sensor) through an aperture of a shutter 12 having a diaphragm function. The image capturing unit 14 outputs an electric analog image signal by converting the optical image. An analog-to-digital conversion unit 16 (indicated by "A/D") converts the analog image signal supplied from the image capturing unit 14 into a digital image signal. The image capturing unit 14 and the analog-to-digital conversion unit 16 are controlled by a clock signal and a control signal which are supplied from a timing generating circuit 18. The timing generating circuit 18 is controlled by a memory control circuit 22 and a system control circuit 50.

An image processing circuit 20 performs image processing, such as pixel interpolation and color conversion, on image data (the digital image signal) supplied from the analog-to-digital conversion unit 16 or image data supplied from the memory control circuit 22.

On the basis of image data obtained by the image capturing unit 14, the image processing circuit 20 calculates data for through-the-lens (TTL) auto-focus (AF) processing, auto-exposure (AE) processing, and automatic control of light by pre-emission of flash. The image processing circuit 20 supplies the results of the calculation to the system control circuit 50.

Based on results of the calculation, the system control circuit 50 controls an exposure control unit 40 and a macrometer control unit (AF control unit) 42 and auto-exposure and auto-focus functions are realized. In addition, the image processing circuit 20 executes TTL auto-white-balance (AWB) processing based on the image data obtained by the image capturing unit 14.

The memory control circuit 22 controls the analog-to-digital conversion unit 16, the timing generating circuit 18, the image processing circuit 20, an image display memory 24, a digital-to-analog conversion unit 26 (indicated by "D/A"), a memory 30, and a compression/decompression circuit 32.

The image data output from the analog-to-digital conversion unit 16 is written into the image display memory 24 or the memory 30 through the image processing circuit 20 and the memory control circuit 22, or through the memory control circuit 22 without passing through the image processing circuit 20.

The image data written for display in the image display memory 24 is converted by the digital-to-analog conversion unit 26 into an analog image signal for display, and the analog image signal is supplied to an image display unit 28. Thus, a captured image is displayed on the image display unit 28. By continuously displaying captured images on the image display unit 28, an electronic finder function can be realized. The image display unit 28 for displaying images can be arbitrarily switched on and off on the basis on a command from the system control circuit 50. By using the digital camera 100 in a state in which the image display unit 28 for displaying images is switched off, power consumption of the digital camera 100 can be reduced considerably.

The memory 30 is used to store still images and moving images (captured as images to be recorded on a recording medium) obtained in image capturing. The capacity and access speeds (write speed, read speed) of the optical system 10 can arbitrarily be set. However, in order to enable continuous image capturing in which a plurality of still images are continuously captured, or panoramic image capturing, the memory 30 needs to have a memory capacity and access speeds that match the use. The memory 30 is usable as a work area for the system control circuit 50.

The compression/decompression circuit 32 compresses or decompresses image data by using, for example, adaptive discrete cosine transformation (ADCT). The compression/decompression circuit 32 can read and process (compress/decompress) image data stored in the memory 30, and can write the processed image data into the memory 30.

On the basis of information supplied from the system control circuit 50, the exposure control unit 40 controls the shutter 12 having the diaphragm function. The exposure control unit 40 can have a flash light control function associated with the flash 48 (light-emitting device). The flash 48 has a flash light control unit and an AF auxiliary light projection function.

The macrometer control unit 42 controls a focusing lens unit of the optical system 10 on the basis of the optical system 10. The zoom control unit 44 controls zooming performed by the optical system 10. A barrier control unit 46 controls an operation of a barrier 102 for protecting the optical system 10.

Mode Dial 60 switches operation mode including record mode and play mode.

Each of a display unit 54 (for example, a liquid crystal display (LCD) or a light-emitting diode (LED)) and a sound generator (for example, a speaker) is formed by one or more elements. In response to execution of a program by the system control circuit 50, the display unit 54 can output an operating status, a message, or the like, by using characters, images, sound, etc. The display unit 54 is disposed at an appropriate position in the digital camera 100. A part of the display elements of the display unit 54 can be disposed in the optical finder 104.

Among pieces of the information displayed by the display unit 54, information displayed by an LCD includes, for example, the following items. First, the display unit 54 displays information such as single/continuous shooting indication, a self-timer, a compression rate, the number of pixels for recording, the number of recorded images, and the number of remaining images to be captured. The display unit 54 also displays information such as a shutter speed, a diaphragm value, exposure correction indication, flash indication, red eye weakening indication, macro image capturing, and buzzer setting indication. Furthermore, the display unit 54 may display information such as remaining battery power, error information by a numeral having a plurality of digits, loading states of the recording media 200 and 210, a communication interface operation, a date and time, and image-capturing-mode/information-code reading indication.

In addition, among the pieces of information displayed by the display unit 54, information displayed in the optical finder 104 includes, for example, in-focus indication, image instability alarm, flash charging indication, a shutter speed, a diaphragm value, and exposure correction indication.

A nonvolatile memory 56 is a memory, such as an electronically erasable and programmable read only memory (EEPROM), in which data can electrically be erased or recorded. Object data from an external device and image data may be stored in the nonvolatile memory 56. The nonvolatile memory 56 has region to record a wireless setting value for connecting to a network.

Figure 2:
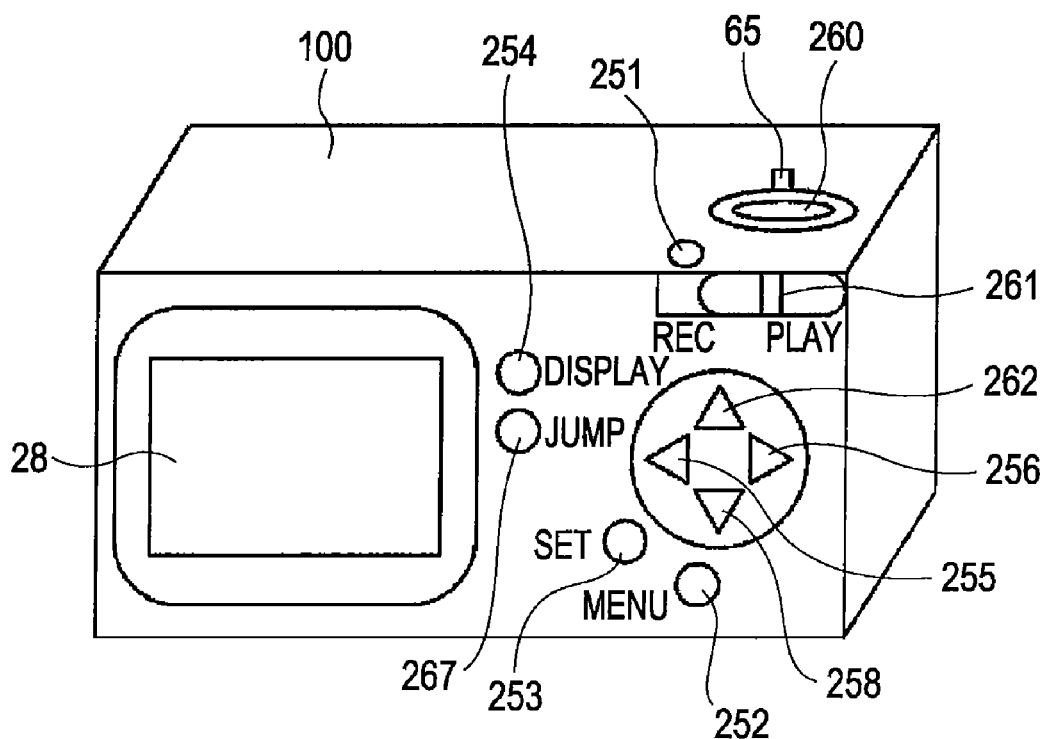
FIG. 2 is a perspective view showing an example of the exterior of the digital camera shown in FIG. 1.

A first shutter switch 62 (SW1) is turned on in the middle of operating the shutter button 260 (i.e., when the shutter button 260 is halfway pressed) shown in FIG. 2. This instructs the system control circuit 50 to initiate processing such as AF processing, AE processing, AWB processing, and pre-emission of flash.

A second shutter switch 64 (SW2) is turned on at the completion of operating the shutter button 260 (i.e., when the shutter button 260 is completely pressed). After that, the image signal is read from the shutter 12 and is converted by the analog-to-digital conversion unit 16 into digital image data. After the digital image data is processed by the image processing circuit 20, the processed data is written into the memory 30 via the memory control circuit 22. In addition, the operation on the second shutter switch 64 instructs the system control circuit 50 to initiate consecutive processing (image capturing) including reading the image data from the memory 30, compressing the image data by the compression/decompression circuit 32, and writing the compressed image data into the recording unit 200 or 210.

A zoom operation unit 65 (FIG. 2) is operated by a photographer in order to change an angle of view (zoom factor or image capture magnification) for image capturing. The zoom operation unit 65 can include one of a slide operating member and a lever operating member and one of a switch and sensor for detecting an operation on the operating member.

An operation unit 70 includes the buttons or switches 251 to 267 shown in FIG. 2. In a case such as switching on and off main power, setting or altering image capture conditions, confirming image capture conditions, confirming the status of the digital camera 100, or confirming captured images, the buttons or switches 251 to 2672 are operated.

A power control unit 80 includes, for example, a power detecting circuit, a DC-DC converter, and a switch circuit for switching between blocks to be supplied with power. By detecting the existence of a power supply, a power supply type, and a remaining battery level, and controlling the DC-DC converter on the basis of the results of the detection and a command from the system control circuit 50, the power control unit 80 supplies necessary power to each block in a necessary period. The digital camera 100 and the power control unit 80 include connectors 82 and 84, respectively, and are connected to each other by the connectors 82 and 84. The power supply 86 is, for example, a primary battery such as an alkaline battery or a lithium battery, a secondary battery such as a NiCd battery, a NiMH battery, or a Li battery, or an AC adapter.

The recording media 200 and 210 are connected to connectors 92 and 96 of the digital camera 100 by connectors 206 and 216 of the recording media 200 and 210. The recording media 200 and 210 respectively include, for example, recording units 202 and 212 such as semiconductor memories or hard disks, and interfaces (each indicated by "I/F") 204 and 214. The recording media 200 and 210 are connected to a bus of the digital camera 100 via interfaces 90 and 94 of the digital camera 100. A recording-medium-loading detecting unit 98 detects whether the recording media 200 and 210 are respectively connected to the connectors 92 and 96.

Although the first embodiment uses two systems of interfaces and connectors for recording media, the number of systems of interfaces and connectors may be one and may be three or more. In the case of a plural number of systems of interfaces and connectors, the systems may have different types of specifications. As the interfaces and the connectors, for example, those that comply with PCMCIA (personal Computer Memory Card International Association) card and CF (Compact Flash) card specifications can be employed.

A case in which those complying with PCMCIA card and CF (Compact Flash) card specifications are employed as the interfaces 90 and 94, and the connectors 92 and 96 is exemplified below. In this case, various types of communication cards, such as a LAN (local area network) card, a modem card, a USB (Universal Serial Bus) card, an IEEE (Institute of Electrical and Electronic Engineers) 1394 card, a P1284 card, a SCSI (small computer system interface) card, and a PHS (personal handyphone system) card, are connectable. By connecting various types of communication cards to the digital camera 100, image data and management information associated with the image data can mutually be transferred among the digital camera 100, other computers, and peripheral devices such as printers.

The optical finder 104 enables implementation of image capturing without using the electronic finder function by the image display unit 28. In the optical finder 104, display elements included in the display unit 54, for example, an in-focus display element, an image instability alarm display element, a flash charging display element, a shutter speed display element, a diaphragm display element, and an exposure correction display element, can be disposed.

The digital camera 100 includes a communication circuit 110, and the communication circuit 110 provides various communication functions such as USB, IEEE 1394, P1284, SCSI, modem, LAN, RS232C, and wireless communications. A connector 112 for connecting the digital camera 100 to a different device, or, when the wireless communication function is provided, an antenna can be connected to the communication circuit 110.

In the first embodiment, the communication circuit 110 has both a wireless LAN interface (IEEE 802.11x) and a USB interface. In addition, the communication circuit 110 has an interface (search mode) for searching for an external device capable of wireless connection and performing wireless communication. The wireless communication in the search mode may be of any type of communication such as a wireless LAN or infrared communication. Normally, communication is performed using radio waves weaker than those used when image data or the like is transmitted or received by using a wireless LAN. The parameters for searching (hereinafter referred to as "search setting values") are recorded beforehand in a wireless setting region of the nonvolatile memory 56.

FIG. 2 shows an example of an exterior view of the digital camera 100. In FIG. 2, components that are unnecessary for description are not shown.

A power button 251 is used to activate and stop the digital camera 100 or to switch on and off the main power of the digital camera 100. A menu button 252 is used to set various types of image capture conditions and to display a menu (including a plurality of items which are selectable and/or whose values are changeable) for displaying the status of the digital camera 100. Modes or items which can be set include, for example, the following modes. Image capture modes concerning determination of exposure include, for example, a program mode, an aperture-priority mode, and a shutter-speed-priority mode. The image capture modes also include an information-code reading mode, a playback mode, a multi-screen-and-erasure mode, and a PC connection mode (where PC represents a computer such as a personal computer). The items that can be set can include exposure correction, a flash setting, single/continuous image-capture switching, a self timer setting, a recording image-quality setting, a date-and-time setting, and recorded image protection. For example, pressing of the menu button 252 allows the system control circuit 50 to display a menu on the image display unit 28. The menu may be displayed in combined form on an image being captured, and may be separately displayed (for example, the menu may be displayed on a predetermined background color). When the menu button 252 is pressed, with the menu displayed, the system control circuit 50 controls the image display unit 28 to finish displaying the menu.

A determination button 253 is pressed when a mode or item is determined or selected. Pressing of the determination button 253 (indicated by "SET") allows the system control circuit 50 to set a mode or item selected at the time. A display button 254 is used to select whether to display image capture information concerning a captured image and to select whether to allow the image display unit 28 to function as an electronic finder.

A left button 255, a right button 256, an upward button 262, and a downward button 258, that is, direction selecting keys, are also used to change an option (for example, an item or image), such as a cursor or highlighted portion, which is selected among a plurality of options. Instead, in order to change the position of an indicator specifying the selected option or to increase or decrease a numeric value (such as the correction value or date-and-time value), the buttons can be used. By using the left button 255, the right button 256, the upward button 262, and the downward button 258, one item can be selected from among the plurality of items. In addition, a user interface may be configured to select two or more items. For example, when the left button 255, the right button 256, the upward button 262, and the downward button 258 are selectively operated, with the determination button 253 pressed, the system control circuit 50 can recognize that two or more items designated by the operation are selected.

As described above, by halfway pressing the shutter button 260, the system control circuit 50 is instructed to initiate processing such as the AF processing, the AE processing, the AWB processing, or the flash pre-emission. In addition, by completely pressing the shutter button 260, the system control circuit 50 is instructed to perform image capturing.

A recording/playback selector switch 261 is used to switch from a recording mode to a playback mode and to switch from the playback mode to the recording mode.

A jump key 267 serves as a direction selecting key and is used to change an option (for example, an item or image), such as the cursor or highlighted portion, which is selected from among the options, or to change the position of an indicator specifying the selected option. A cursor movement performed by using the jump key 267 may be set to be faster or larger than that performed by using the direction selecting keys.

Instead of the above-described operation system, a dial switch may be employed and another operation system may be employed.

Figure 13:
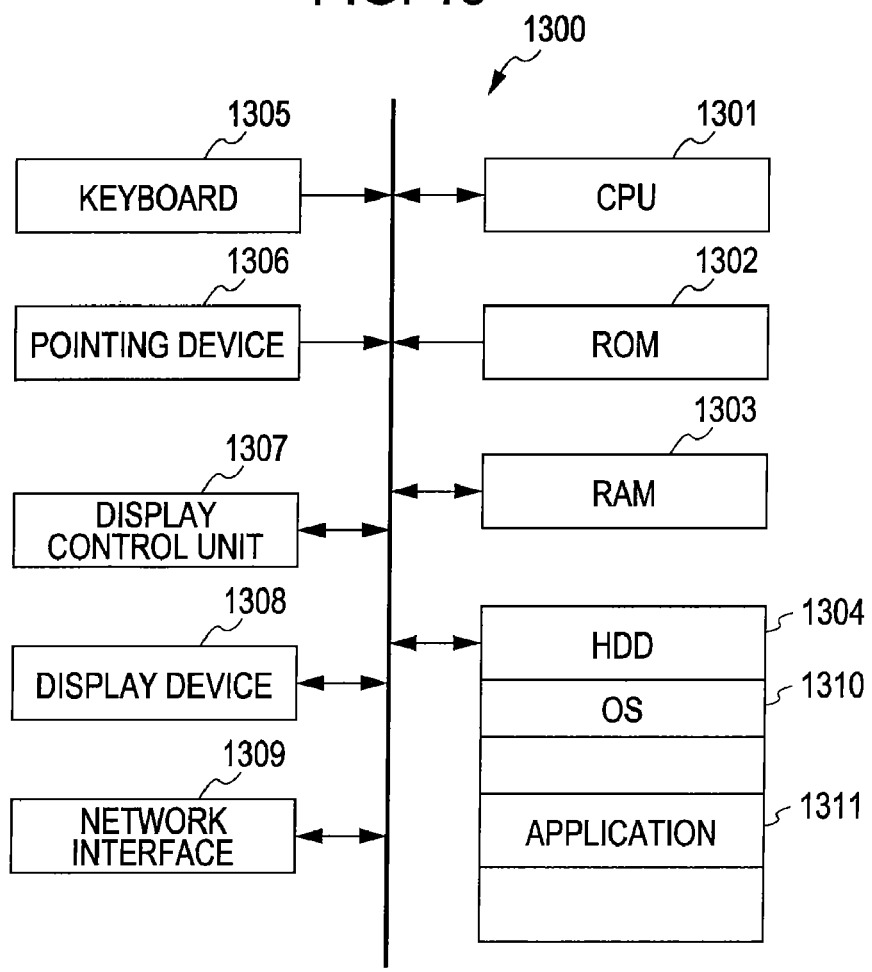
FIG. 13 is a block diagram showing an example of a hardware configuration of the hardware of a personal computer.

FIG. 13 is a block diagram of the personal computer 1300. A central processing unit (CPU) 1301 controls the personal computer 1300. A read-only memory (ROM) 1302 stores a basic input/output system (BIOS) and a boot program. A random access memory (RAM) 1303 is used as a work area for the CPU 1301. In a hard disk drive (HDD) 1304, programs for performing various types of processing, for example, an operating system (OS) 1310, and a wireless setting application 1311, are stored beforehand. The CPU 1301 loads these programs and executes the processing in accordance with program description.

A keyboard 1305 and a pointing device 1306 are used to input characters or give various instructions in response to user's operations. A display control unit 1307 performs imaging in a built-in video memory in response to a command from the CPU 1301. The display control unit 1307 outputs image data stored in the video memory as a video signal to a display device 1308. The display device 1308 is a cathode-ray tube (CRT) or a liquid crystal display (LCD). A network interface 1309 is used to connect the personal computer 1300 to a network, and enables the personal computer 1300 to transfer print data to a printer on the network and to access various devices on the network. The network interface 1309 may have either of a wired connection form and a wireless connection form, or may have both forms. In the first embodiment, the personal computer 1300 has both wired and wireless functions.

Figure 14:
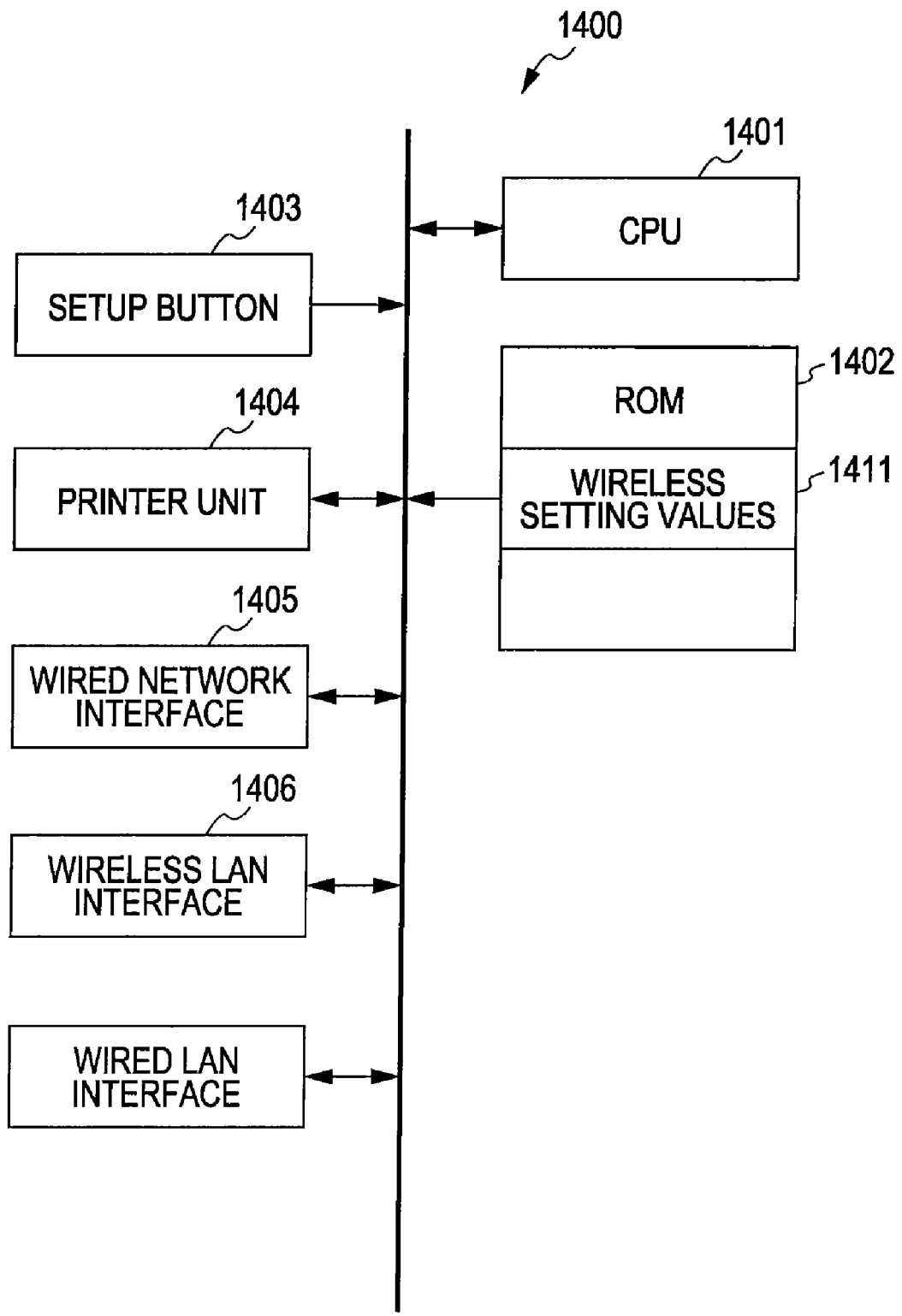
FIG. 14 is a block diagram of an example of a hardware configuration of a printer.

FIG. 14 is a block diagram of a printer 1400. The shown printer 1400 has the following configuration.

Wireless setting values 1411 and search setting values are stored beforehand before shipment in a ROM 1402.

A printer unit 1404 prints images which are received from wireless LAN interface 1406 and wired network interface 1405, for example USB interface, in response to a command from the CPU 1401. Each network interface is intended to connect the printer 1400 to the network, and enables the printer 1400 to receive print data from a personal computer on the network.

The wireless LAN interface 1406 enables the printer 1400 to connect to a wireless network.

A setup button 1403 is a trigger for setting the printer 1400 to the wireless search mode. Pressing of the setup button 1403 sets the printer 1400 to the search mode, and the printer 1400 wirelessly transmits the search setting values stored in a ROM (wireless setting region) 1402. The wireless communication at this time may be either of wireless LAN communication and infrared communication. In addition, after a predetermined time passes, the CPU 1401 may cancel the search mode. The search setting values stored in the ROM 1402 for establishing wireless connection in the search mode are equal to those in the wireless setting region of the nonvolatile memory 56 in the above-described digital camera 100. In order words, by pressing the setup button 1403, an ad hoc network can be established between the printer 1400 and the digital camera 100, and data can be exchanged.

The digital camera 100, the personal computer 1300, and the printer 1400 in the first embodiment have been described. A setting method in the first embodiment for connecting the digital camera 100 to the wireless LAN is described below.

The reason that the digital camera 100 has the wireless LAN communication function is to transfer captured images to a file server on the network and to control a printer on the network to print the captured images.

If the digital camera 100 has hardware for connecting to the wireless LAN, various settings for the communication are necessary. In this embodiment, parameters used for the settings are called "wireless setting values".

Normally, connection to a wireless LAN complying with an IEEE 802.11 series needs the following items. First, it is necessary to set an ESS-ID that is a network identifier for the wireless LAN. In addition, various settings are necessary, such as a WEP key that is an encryption key for preventing a leak, a channel for use, and selection of either the infrastructure mode or the ad hoc mode as a communication method. Encryption technology is not described since it is well-known.

Regarding the ESS-ID and the WEP key, it is necessary to input characters constituting each character string.

To input the characters, it is possible that, after connecting the personal computer 1300 and the digital camera 100 by a wired network such as USB, wireless setting values be input by the personal computer 1300. In this case, the application 1311 is activated and the user inputs wireless setting values with the keyboard 1305 and/or the pointing device 1306. In addition, the personal computer 1300 transmits the wireless setting values to the digital camera 100, and the wireless setting values are set in the digital camera 100.

In addition, it is possible that the wireless setting values be acquired and set by wireless communication. In this case, the printer 1400 is set to the search mode by pressing the setup button 1403 of the printer 1400, and the printer 1400 is connected to the wireless network according to the search setting value. By also setting the digital camera 100 to the same search mode, the digital camera 100 is connected to the wireless network. After that, the digital camera 100 acquires the wireless setting values 1411 in the ROM 1402 of the printer 1400.

However, in the above two manners the user has to perform different operations. For example, a user who has configured settings for wireless connection from the personal computer 1300 by using the application 1311 may be confused when configuring wireless connection settings next time from the printer 1400.

Accordingly, in this embodiment, when the digital camera 100 requests acquisition of the wireless setting values, by determining whether the digital camera 100 is connected to the personal computer 1300 by USB cable, and displaying different types of guidance, the user can be prevented from being confused.

A method for realizing the above is described below with reference to the drawings.

Figure 4:
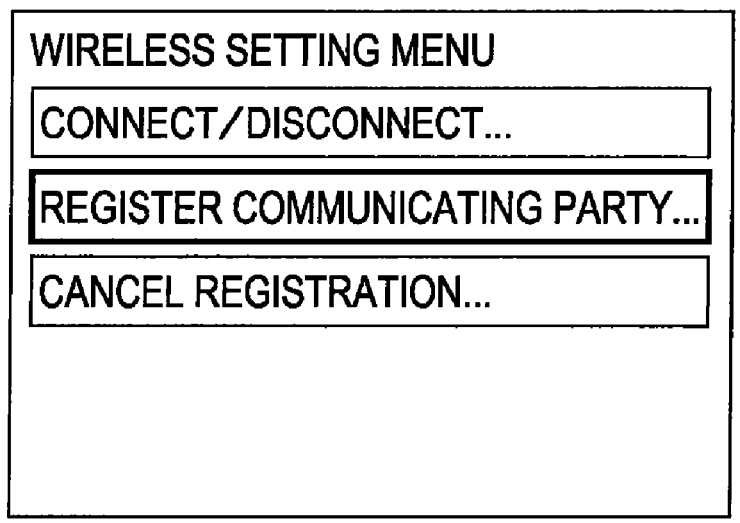
FIG. 4 is an illustration of a guidance screen serving as a trigger for acquiring wireless setting values.

When the user establishes connection to the wireless LAN, first, the user instructs the digital camera 100 to request acquisition of wireless setting values in accordance with the guidance (FIG. 4) displayed on the image display unit 28.

Figure 3B:
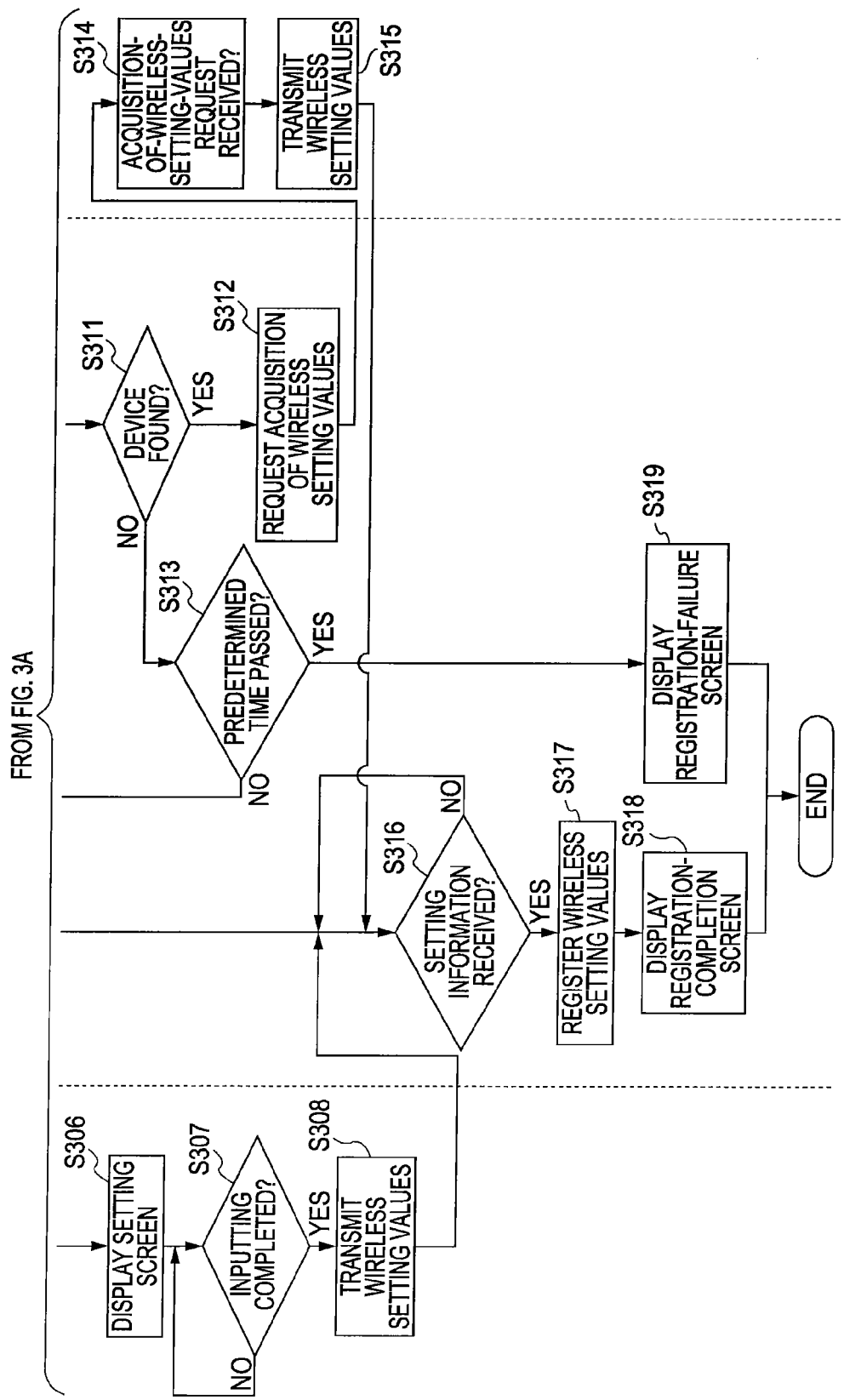

FIGS. 3A and 3B show flowcharts of processes of the digital camera 100, the personal computer 1300, and the printer 1400 after the acquisition of the wireless setting values is requested.

Figure 11:
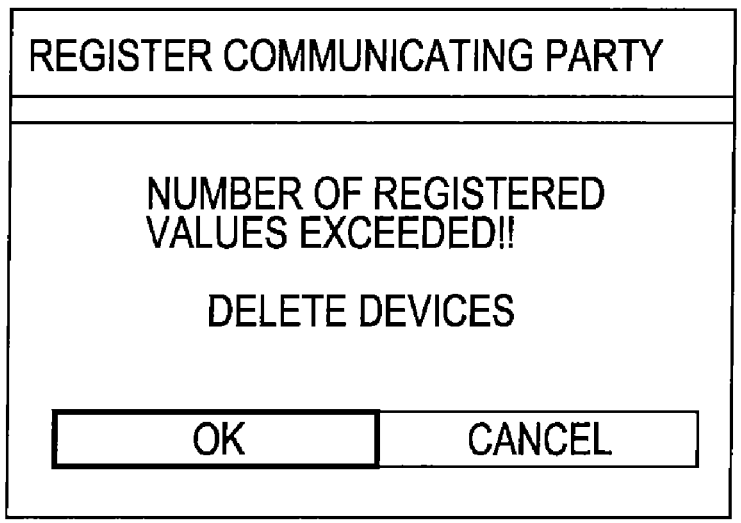
FIG. 11 is an illustration of a warning screen displayed when the number of registered values is exceeded.
Figure 12:
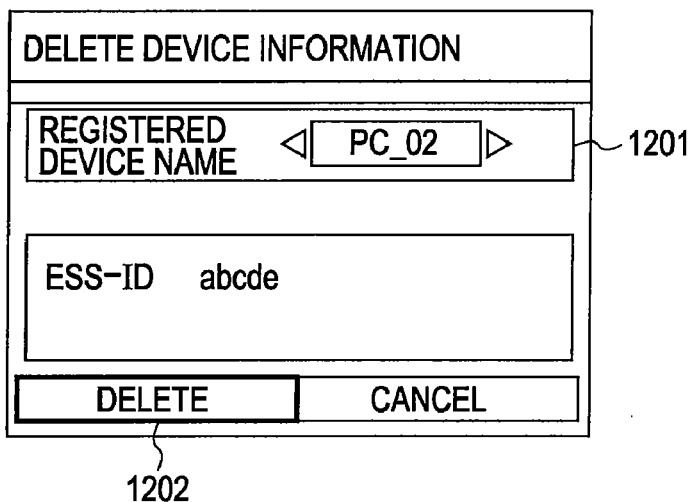
FIG. 12 is an illustration of a guidance screen displayed in step S303 shown in FIG. 3.

When the acquisition of the wireless setting values is requested, the system control circuit 50 determines whether the number of the registered wireless setting values exceeds a predetermined value by referring to the number of wireless setting values registered in the wireless setting region of the nonvolatile memory 56 (step S301). If the system control circuit 50 has determined that the predetermined threshold for number of registered values has been exceeded, the system control circuit 50 displays the warning screen shown in FIG. 11. In step S303, the system control circuit 50 displays the device-information deletion screen shown in FIG. 12.

As described above, before connection to an external device is established, the user is warned that it is impossible to register wireless setting values, and the digital camera can secure a free region in the wireless setting region by promptly deleting an unnecessary device.

When, on the device-information deletion screen, the user selects a registered previously device name 1201 and presses a delete button 1202, the system control circuit 50 deletes already registered wireless setting values.

After performing step S303, the system control circuit 50 returns to step S301. If device deletion is performed and the wireless setting region includes a free portion, i.e., it is determined in step S301 that the predetermined threshold value for number of registered values has not been exceeded, the system control circuit 50 proceeds to step S302 and performs wireless setting value registration.

Since wireless setting value deletion is performed in consecutive processing in such a manner, even if the number of registered wireless setting values exceeds the predetermined value, wireless setting value registration can be performed without termination of the process by the user.

If, in step S301, it is determined that the number of registered wireless setting values is not exceeded, in step S302, the system control circuit 50 confirms whether the communication circuit 110 has USB connection to the personal computer 1300.

If, in step S302, the system control circuit 50 determines that the communication circuit 110 is connected to the personal computer 1300 by the USB cable, in step S304, the system control circuit 50 transmits a signal requesting setting values to the personal computer 1300 through the wired communication such as USB. This signal includes a signal requesting activation of the application 1311.

Figure 7:
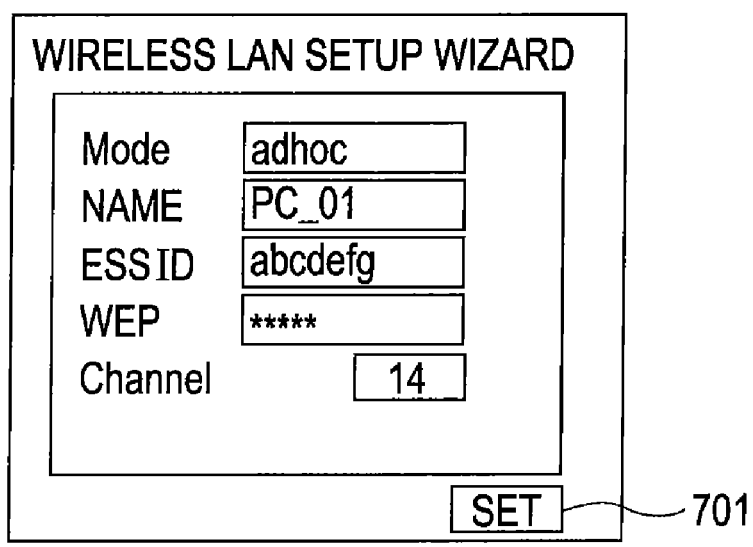
FIG. 7 is an illustration of an application setting screen.

In step S305, when the CPU 1301 receives the signal requesting activation of the application 1311, the CPU 1301 activates the application 1311. In step S306, the CPU 1301 displays the application setting screen shown in FIG. 7 on the display device 1308 of the personal computer 1300.

Figure 5:
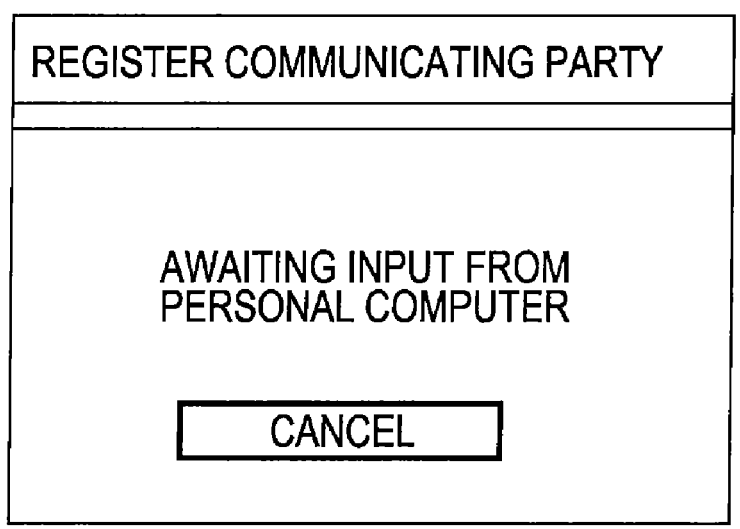
FIG. 5 is an illustration of a guidance screen displayed in step S320 shown in FIG. 3.

In step S320, after the system control circuit 50 of the digital camera 100 transmits the signal requesting activation of the application 1311, the system control circuit 50 displays the guidance shown in FIG. 5 on the image display unit 28 so that the wireless setting values are input using the application 1311. The guidance shown in FIG. 5 is displayed when it is determined in step S302 that a USB cable is connected. The guidance screen informs the user that acquiring wireless setting values is done through a USB connection. In other words, the displayed screen allows the user to easily recognize that the wireless setting values are input from the personal computer 1300.

The user inputs wireless setting values by operating the personal computer 1300. The user uses the keyboard 1305 to input predetermined wireless setting values on the setting screen shown in FIG. 7, and presses a set button 701. When the set button 701 is pressed, the CPU 1301 determines that inputting is complete for setting of wireless setting values in the screen shown in FIG. 7 (yes in step S307) and transmits a setting completion signal to the digital camera 100 with the wireless setting values through the USB cable (step S308).

Figure 6:
FIG. 6 is an illustration of a guidance screen displayed in step S318 shown in FIG. 3.

When, in step S316, it is determined that the system control circuit 50 in the digital camera 100 acquired the wireless setting values and the setting completion signal, in step S317, the system control circuit 50 stores the received wireless setting values in the wireless setting region of the nonvolatile memory 56. Then, in step S318, in order to notify the user of completion of registration, the system control circuit 50 displays the registration completion screen shown in FIG. 6 on the image display unit 28. On the registration completion screen, some of the wireless setting values set by the user may be displayed for confirmation by the application 1311.

The USB connection may be disconnected due to a problem such as a cable pulled out between steps S304 and S308. When the system control circuit 50 detects the disconnection between steps S304 and S308, the system control circuit 50 automatically may proceed to step S309 and may acquire wireless setting values by using wireless connection.

Next, a method for acquiring wireless setting values from the printer 1400, which is not connected by the USB cable, is described below. This method is similar to the case of the personal computer 1300 up to a point in which, after the system control circuit 50 transmits an acquisition requesting signal as a trigger in response to a user's operation, the system control circuit 50 determines concerning registration.

If, in step S302, it is determined the digital camera 100 has no USB connection to the personal computer 1300, the system control circuit 50 sets the digital camera 100 to the search mode. When the digital camera 100 is set to the search mode, in step S309, the system control circuit 50 initiates wireless communication by using search setting values.

At this time, the printer 1400, from which wireless setting values are to be acquired, must be connected to the same network. As described above, pressing of the setup button 1403 allows the printer 1400 to perform wireless communication by using search setting values identical to those of the digital camera 100, and establishes an ad hoc network.

Figure 8:
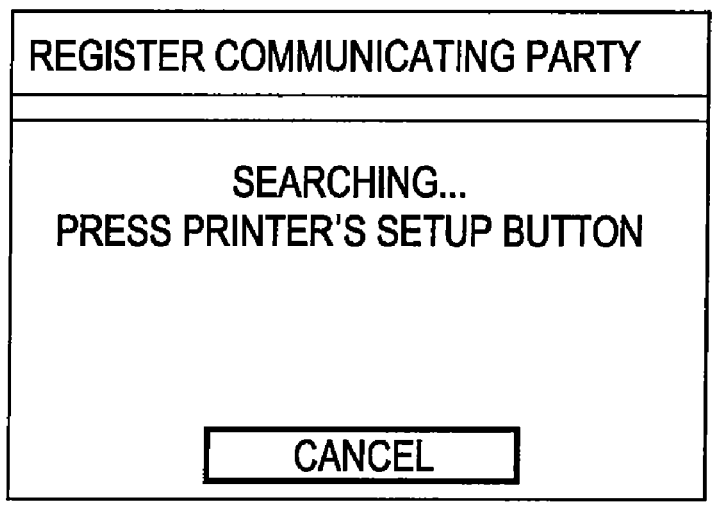
FIG. 8 is an illustration of a guidance screen displayed in step S310 shown in FIG. 3.

Accordingly, as shown in FIG. 8, in step S310, the system control circuit 50 displays guidance that urges the user to press the printer's setup button 1403. The displayed guidance enables the user to easily know that wireless setting values are acquired by wireless communication from the printer 1400.

Figure 26:
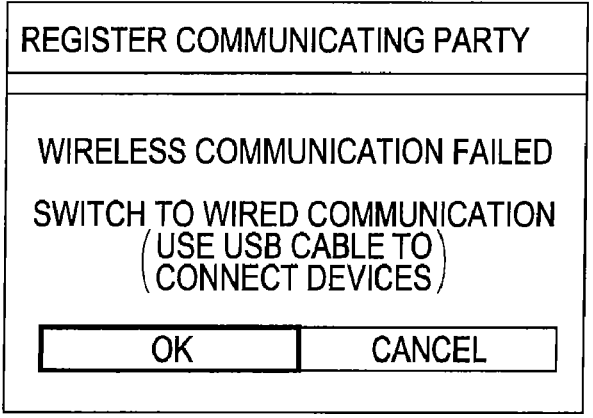
FIG. 26 is an illustration of a guidance screen displayed when communication becomes impossible during wireless acquisition of wireless setting values.

In the middle of the searching in step S309 or during acquisition of wireless setting values in step S312 and the subsequent steps, the communication circuit 110 has a state such as inability of communication, or extreme reduction of transfer speed caused by interference. The system control circuit 50 checks the state of the communication circuit 110. When the system control circuit 50 detects a state in which the transfer speed is smaller than a predetermined value, the system control circuit 50 displays, on the image display unit 28, a screen for urging the user to switch to acquire a setting value by using wired communication. FIG. 26 shows a screen displayed when the system control circuit 50 determines that communication is impossible. When, during display of this screen, the communication circuit 110 detects that the personal computer 1300 and the digital camera 100 are connected by wire by the user, the system control circuit 50 automatically proceeds to step S304 for setting value acquisition by wired communication.

In step S311, the system control circuit 50 determines whether the printer 1400, which is set in the search mode, is found, within a predetermined time, that is, whether the printer 1400, with the setup button 1403 pressed, is found.

In step S312, when the printer 1400 is found, the digital camera 100 transmits, a signal requesting acquisition of wireless setting values, to the printer 1400.

When, in step S314, the CPU 1401 in the printer 1400 receives the acquisition requesting signal, in step S315, the CPU 1401 transmits the wireless setting values 1411 in the ROM 1402 to the digital camera 100.

When, in step S316, the system control circuit 50 in the digital camera 100 receives the wireless setting values 1411, in step S317, the system control circuit 50 stores the received wireless setting values in the wireless setting region of the nonvolatile memory 56.

Figure 9:
FIG. 9 is an illustration of a guidance screen displayed in step S318 shown in FIG. 3.

After storing the wireless setting values, the system control circuit 50 displays the registration completion screen shown in FIG. 9 on the image display unit 28 in order to notify the user of completion of registration. For confirmation, the registration completion screen may display some of the wireless setting values set by the user.

Figure 10:
FIG. 10 is an illustration of a guidance screen displayed in step S319 shown in FIG. 3.

If the printer 1400 is not found in the predetermined time in steps S311 and S313, in step S319, the system control circuit 50 stops wireless communication and displays the dialog shown in FIG. 10 in order to notify that wireless setting value acquisition has failed.

By executing the above steps, registration of a device to which the digital camera 100 is connected is completed. After registration, the user selects the item "CONNECT/DISCONNECT" from the wireless setting menu shown in FIG. 4. In response to this operation, the digital camera 100 establishes wireless communication with a registered external device by using the wireless setting values.

As described above, in the first exemplary embodiment, methods for acquiring the wireless setting values are used depending on in which of wired connection and the wireless connection the digital camera 100 is connected. When one of the methods is used, which method is being executed is displayed as guidance. Thus, the user can smoothly configure wireless settings without being confused.

Second Exemplary Embodiment

In the above-described first embodiment, the digital camera 100 and the personal computer 1300 are connected by USB cable. Similar processing may be performed in a case in which the digital camera 100 and the printer 1400 are connected to each other by USB cable. In this case, the printer 1400 includes the display device 1308 and the application 1311.

When the system control circuit 50 determines that the printer 1400 and the digital camera 100 are connected to each other by USB cable, the system control circuit 50 transmits a setting application activating request to the printer 1400.

When the printer 1400 receives the activating request, the CPU 1401 in the printer 1400 activates the setting application. The CPU 1401 displays the setting screen shown in FIG. 7 on a display device for the printer 1400. After that, processing similar to that performed when wireless settings are configured from the personal computer 1300 may be performed. After the settings are configured, similarly to the first embodiment, data, such as image data, can be exchanged by wireless communication using wireless communication values between the digital camera 100 and the printer 1400.

Third Exemplary Embodiment

Next, a third exemplary embodiment of the present invention is described below with reference to FIGS. 15A to 19.

Figure 21:
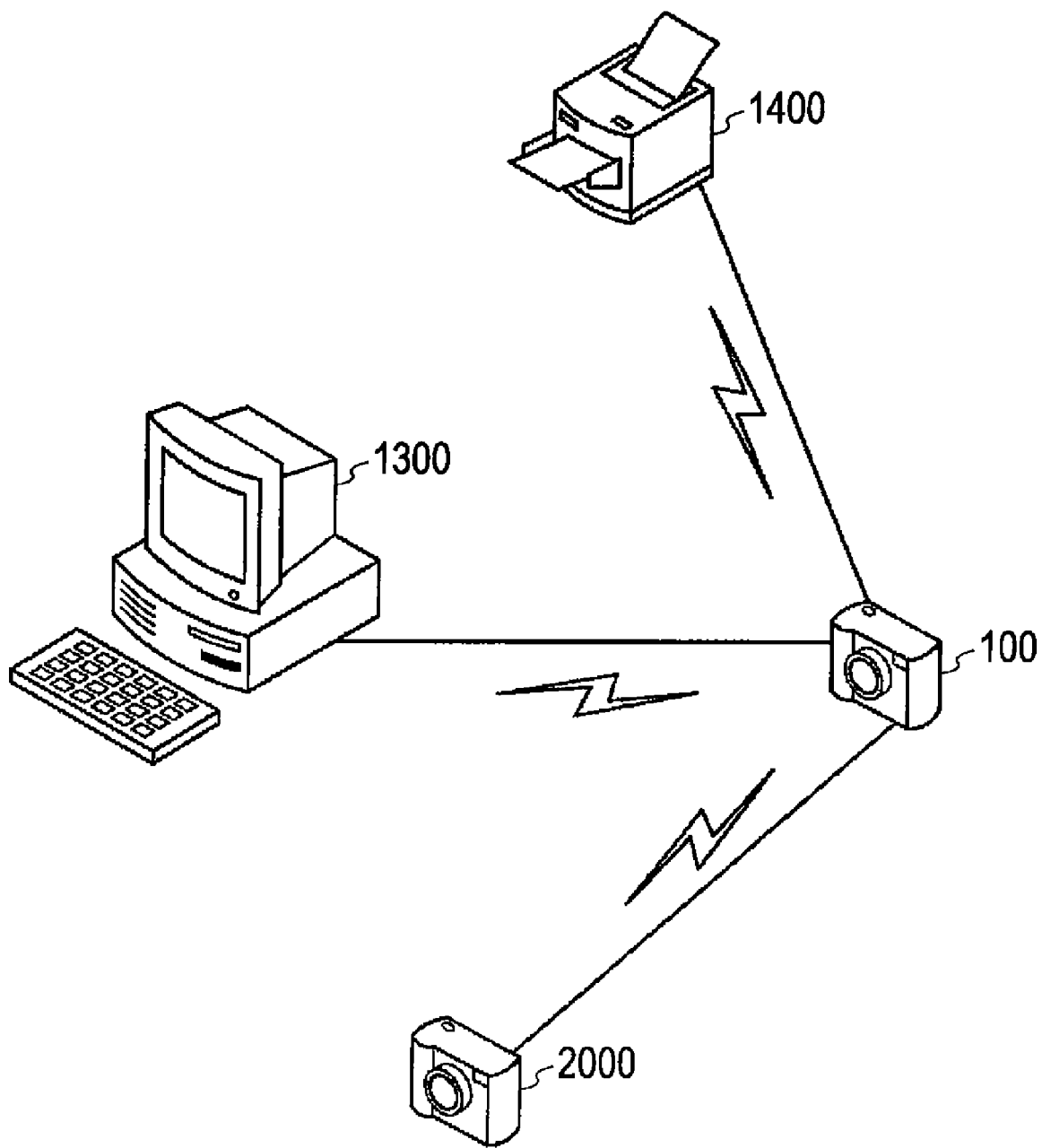
FIG. 21 is an illustration of the configuration of a system according to the third embodiment of the present invention.

FIG. 21 illustrates an exemplary configuration of a system according to the third embodiment of the present invention. In the third embodiment, the digital camera 100 can wirelessly connect to a different digital camera 2000. The digital camera 2000 is not described since it is identical in configuration to the digital camera 100. To connect both digital cameras, first, one digital camera initiates the search mode and establishes an ad hoc network. The other digital camera also initiates the search mode, thus connecting to the same network (participating in the ad hoc network). One digital camera transmits wireless setting parameters to the other digital camera, with both participating in the same network, and the wireless setting values are registered between both digital cameras.

A device configuration and operation in the third embodiment are common in many points to those in the first embodiment. Accordingly, portions common to those in the first embodiment are not described, and details of processing characteristic in the third embodiment are described below.

Figure 19:
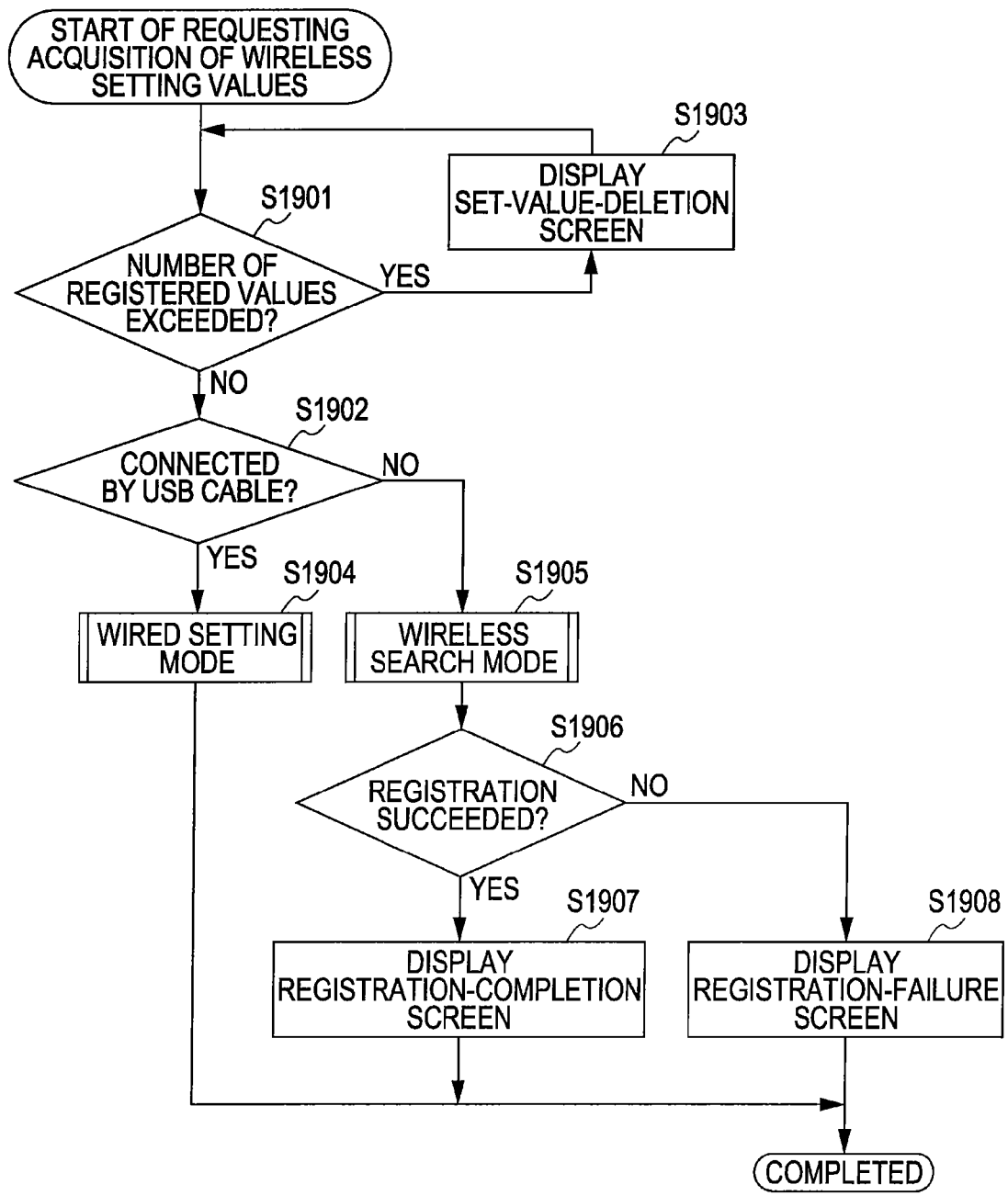
FIG. 19 is a flowchart showing a process of acquiring wireless setting values in a third embodiment of the present invention.

FIG. 19 is a flowchart showing exemplary processing of the third embodiment. Also in the third embodiment, the system control circuit 50 executes processing in accordance with an input signal and a program.

Steps S1901 to S1903 in FIG. 19 are identical to steps S301 to S303 in FIG. 3A. If, in step S1902, it is determined that the digital camera 2000 is connected to a different device by USB cable, the system control circuit 50 proceeds to step S1904. In step S1904, a wired setting mode is performed and the system control circuit 50 performs processing similar to steps S304 to S308 and steps S316 and S318.

If, in step S1902, it is determined that the digital camera 2000 is not connected to the different device by USB cable, in step S1905, the system control circuit 50 initiates processing in a wireless search mode.

Figure 16:
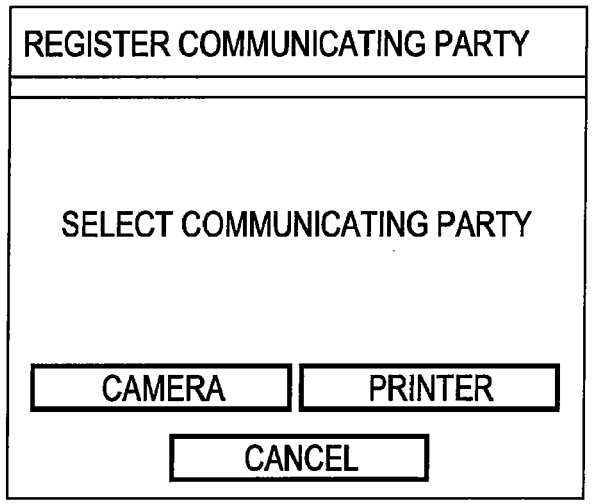
FIG. 16 is an illustration of a guidance screen displayed in step S1502 shown in FIG. 15A.

FIG. 15 is a detailed flowchart of step S1905 in FIG. 19. First, in step S1502, the system control circuit 50 displays, on the image display unit 28, a screen for urging the user to select a type of a device to be registered, and waits for the user to input a selection input. FIG. 16 shows a screen for urging the user to select the type of the device. In the third embodiment, a camera and a printer are displayed as search candidates in the search mode.

In step S1503, the system control circuit 50 determines which of the printer and the camera is selected. If the system control circuit 50 has determined that the printer is selected, the system control circuit 50 proceeds to step S1504.

In step S1504, the system control circuit 50 displays search guidance for the printer on the image display unit 28, and proceeds to step S1506. The displayed search guidance for the printer is similar to the screen shown in FIG. 8. In response to selection of the printer in step S1503, the search guidance for the printer for urging the user to operate the printer is displayed.

Figure 17:
FIG. 17 is an illustration of a guidance screen displayed in step S1505 shown in FIG. 15A.

If, in step S1503, it is determined that the camera is selected, the system control circuit 50 proceeds to step S1505. In step S1505, the system control circuit 50 displays search guidance for the camera on the image display unit 28, and proceeds to step S1506. The displayed search guidance for the camera is shown in FIG. 17. In response to selection of the camera in step S1503, the search guidance for the camera for urging the user to operate the camera is displayed. As shown in FIG. 17, in the case of connecting to the different digital camera 2000, a screen for urging the user to switch the digital camera 2000 to the search mode is displayed.

In such a manner, different search guidance is displayed depending on a type of device to be searched for, and the user can perform the next operation without being confused.

In step S1506, similarly to the first embodiment, the system control circuit 50 initiates searching by using weak radio waves. Step S1506 is identical to step S309 in FIG. 3A.

In step S1507, the system control circuit 50 determines whether the device, which is set in the search mode, is found within a predetermined time. If the device is found, the system control circuit 50 proceeds to step S1509. If the device is not found, the system control circuit 50 proceeds to step S1508 and if it is determined in step S1508 that a predetermined amount of time has passed, registration fails (step S1518) and processing returns (to FIG. 19).

In step S1509, the system control circuit 50 transmits an acquisition requesting signal to the digital camera 2000, which is found. In step S1510, the system control circuit 50 determines which device is selected in step S1503.

When the found device is not the printer, i.e., is the digital camera 2000, in step S1513, the system control circuit 50 in the digital camera 2000 receives the acquisition requesting signal. In step S1514, the system control circuit 50 transmits wireless setting values to the digital camera 100.

When the found device is the printer 1400, processing in the printer 1400 is performed. Steps S1511 and S1512 in FIG. 15B are identical to steps S314 and S315 in FIG. 3B.

In step S1515, the system control circuit 50 of the digital camera 100 receives a transmission-completion signal from the digital camera 2000 or the printer 1400. In step S1516, the system control circuit 50 stores the received setting values in the nonvolatile memory 56, and, in step S1517, the wireless search mode finishes and processing returns (to FIG. 19).

Before exchanging the wireless setting values, the system control circuit 50 may request the found device to transmit data representing the type of the device. In this case, in response to the request from the digital camera 100, the found device, which serves as a communicating party, transmits device-type data indicating which of the digital camera and the printer the found device is. The system control circuit 50 receives the device-type data, and determines whether the indicated device type is the device type selected in step S1503. If the indicated device type matches the selected device type, the wireless setting values are exchanged. If the indicated device type does not match the selected device type, the wireless setting values are not exchanged. The device-type data may be transmitted with the wireless setting values. In this case, only when the indicated device type matches the selected device type does the system control circuit 50 store the wireless setting values in the nonvolatile memory 56.

In step S1906 in FIG. 19, by confirming whether the wireless setting values are stored in the nonvolatile memory 56, the system control circuit 50 determines whether registration has succeeded. If it is determined that the registration has succeeded, the system control circuit 50 proceeds to step S1907. If it is determined that the registration has not succeeded, the system control circuit 50 proceeds to step S1908.

Figure 18:
FIG. 18 is an illustration of a guidance screen displayed in step S1507 shown in FIG. 15A.

In step S1907, the system control circuit 50 displays the registration-completion screen shown in FIG. 18 on the image display unit 28 in order to notify the user of completion of the registration.

In step S1908, the system control circuit 50 displays, on the image display unit 28, the dialog shown in FIG. 10 which indicates that the wireless setting value acquisition has failed.

As described, above according to the third embodiment, when wireless setting values are acquired, a type of device to be registered is selected by the user. A registration method for the type of device is displayed on the image display unit 28 in the digital camera 100, which is at hand of the user. Thus, the user can smoothly configure settings without being confused.

In the third embodiment, setting of a wireless LAN of a digital camera has been described. However, what is set is not limited to a wireless LAN and a device to be set is not limited to a digital camera.

Fourth Exemplary Embodiment

The above-described first exemplary embodiment describes that communication for use in the search mode may be either of a wireless LAN and infrared communication. A fourth exemplary embodiment of the present invention describes a case in which acquisition of wireless setting values by using the search mode can be performed by selecting one of a plurality of wireless communication types. In the following description, points that are common to those in the first embodiment are not described, and features of the fourth embodiment are mainly described below.

The communication circuit 110 in the digital camera 100 has interfaces for a plurality of types of wireless communication. The network interface 109 in the personal computer 1300 also has interfaces for a plurality of types of wireless communication. In addition, the wireless LAN interface 1406 in the printer 1400 also has interfaces for a plurality of types of wireless communication. The plurality of types of wireless communication include, for example, in addition to the above-described wireless LAN and infrared communication, Bluetooth and Ultra-Wideband (UWB).

When such a plurality of types of wireless connections exist, wireless signal intensity may be weak depending on some type of communication, and radio waves in the frequency band of the signal may interfere with one another. Accordingly, the user may hesitate about selection. In this case, it is convenient to perform automatic setting of an optimal communication method between a personal computer and a digital camera and giving to the user of guidance matching the communication method. Accordingly, in the fourth embodiment, when a digital camera requests acquisition of wireless setting values, the digital camera can automatically select an optimal communication method from a wired or wireless network and can notify the result of selection to the user.

Figure 22B:
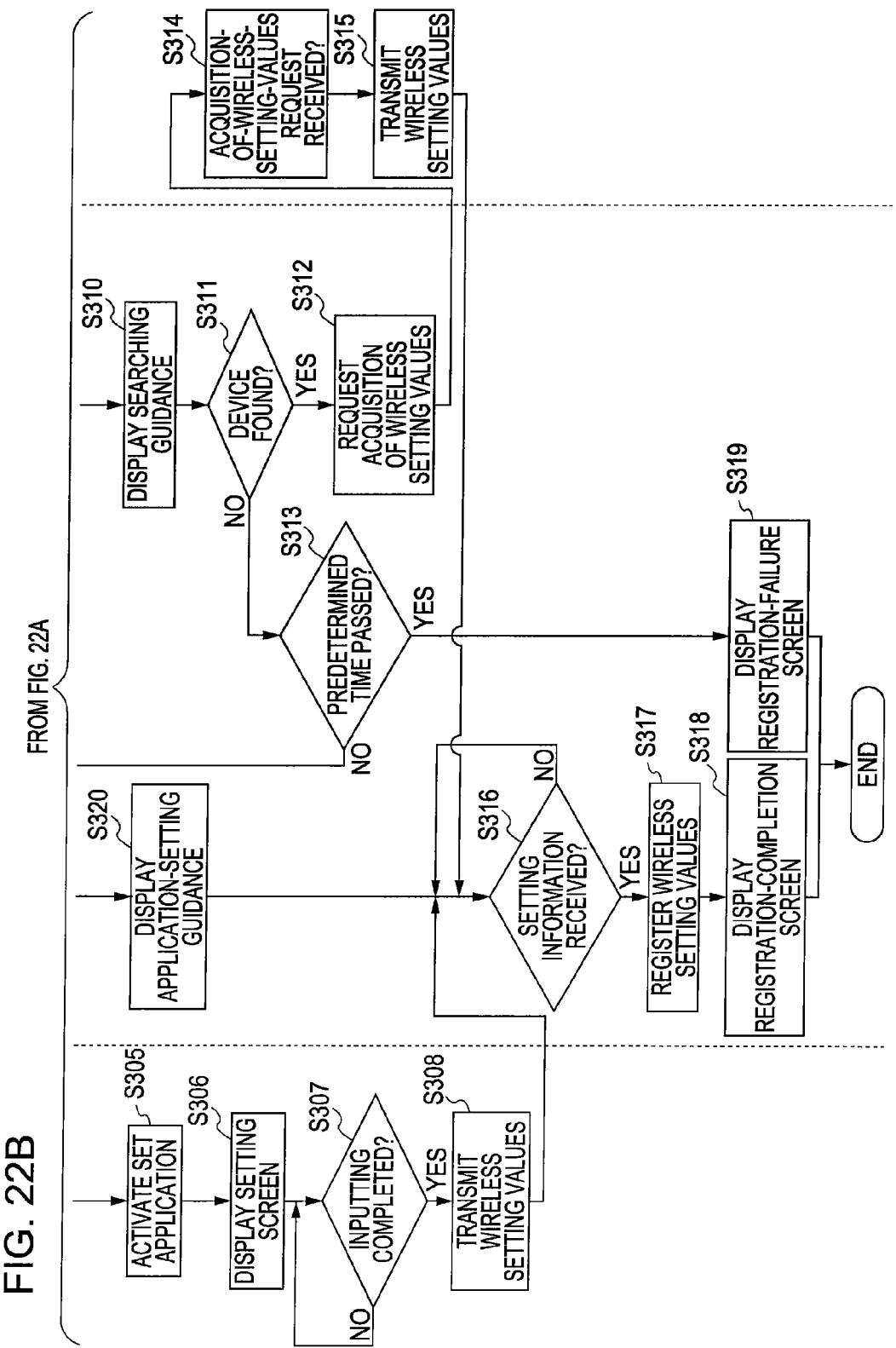
Figure 23:
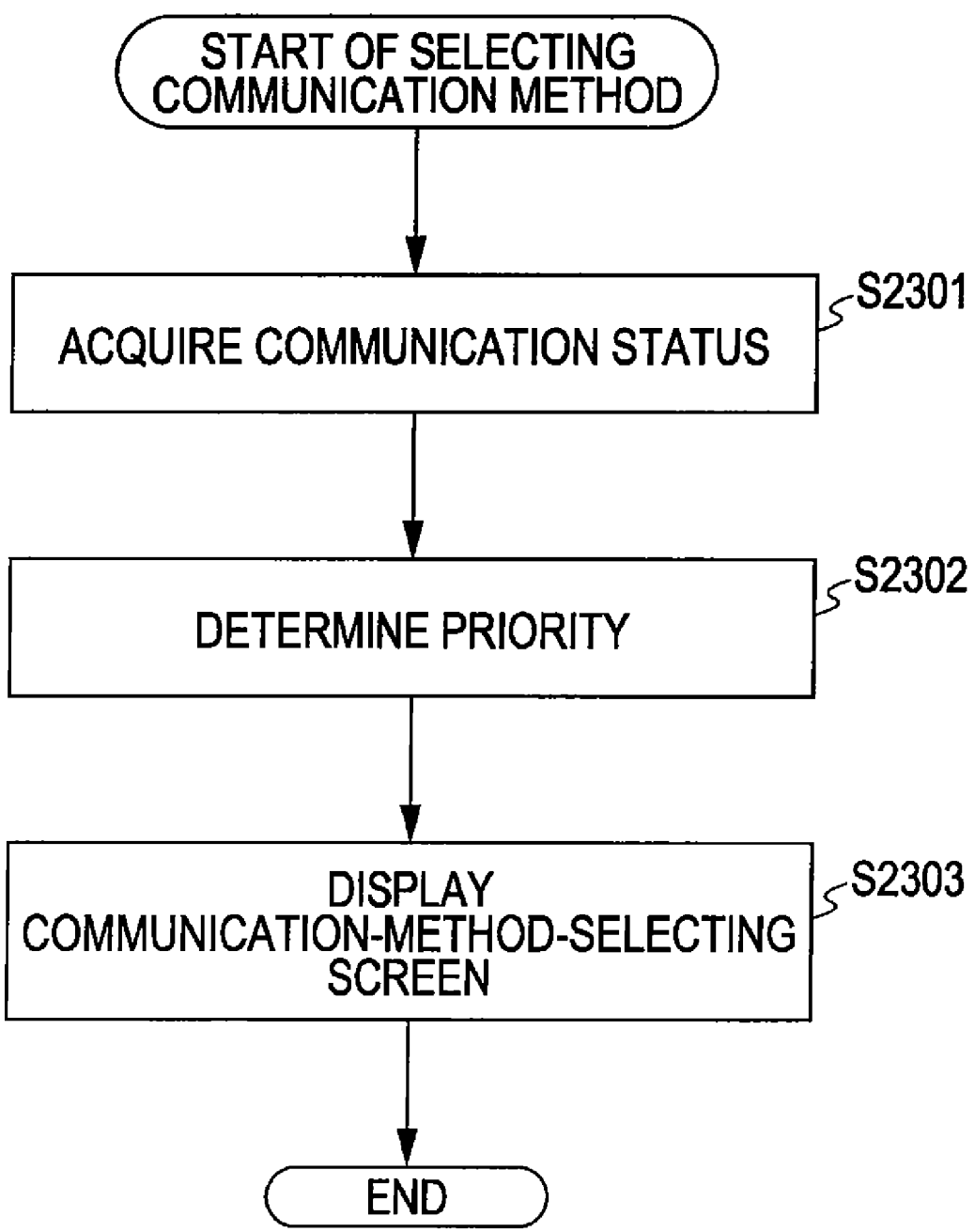
FIG. 23 is a flowchart showing a process of selecting a communication method.

FIGS. 22A and 22B are a flowchart showing a process of the fourth embodiment. Although the process in FIGS. 22A and 22B is similar to that in FIGS. 3A and 3B in basic flow, the process in FIGS. 22A and 22B differs in that step S321 of a subroutine and step S322 are added. In step S321, a communication method is selected. The details of step S321 of the subroutine are shown in FIG. 23.

In step S2301, by checking the status of the communication circuit 110, the system control circuit 50 acquires communication states in a plurality of communication methods. For example, the system control circuit 50 checks information such as radio wave intensity, states of network traffic, and interference of radio waves.

In step S2302, the system control circuit 50 determines the priority levels of the communication methods on the basis of the communication states acquired in step S2301. Regarding the priority levels, if a communication method produces a better communication state, that is, a communication state ensuring a faster transfer speed, a higher priority level is given to the communication method.

Figure 24:
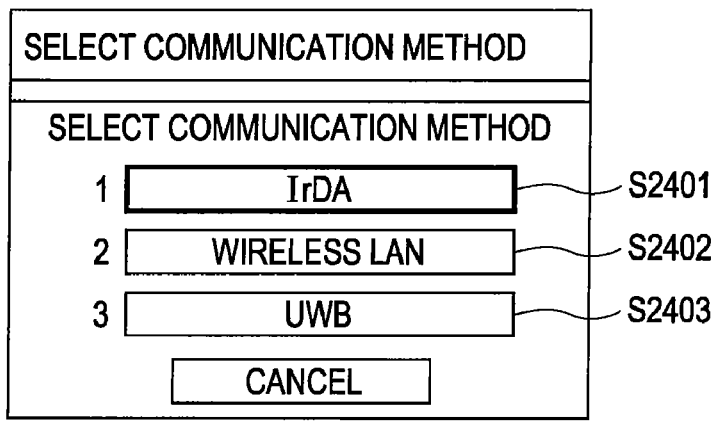
FIG. 24 is an illustration of a screen displayed in step S2303 shown in FIG. 23.

In step S2303, the system control circuit 50 displays, on the image display unit 28, a screen for selecting a communication method, and returns to the process in FIGS. 22A and 22B. An example of the screen for selecting a communication method is shown in FIG. 24. This screen includes communication methods 2401 to 2403. The communication methods shown in FIG. 24 are displayed in order of the priority levels determined in step S2302. In the example in FIG. 24, infrared communication (indicated by "IrDA") has the highest priority level, and UWB has the lowest priority level. The displayed screen enables the user to select an optimal communication method from among a plurality of communication methods.

In step S322 in FIG. 22A, the system control circuit 50 determines whether a communication method is selected by a user's operation. If the communication method is selected, the system control circuit 50 proceeds to step S309. If the communication method is not selected, step S322 in FIG. 22A is repeated.

In step S309 in FIG. 22A, the system control circuit 50 initiates searching by using the selected communication method.

Figure 25:
FIG. 25 is an illustration of a screen displayed in step S310 shown in FIG. 22.

In step S310 in FIG. 22B, the system control circuit 50 displays, on the image display unit 28, search guidance matching the communication method selected in step S321 in FIG. 22A. An example of the search guidance is shown in FIG. 25.

Instead, the system control circuit 50 may automatically initiate the searching in step S309 in FIG. 22A after selecting a communication method having the highest priority level without displaying the screen shown in FIG. 24. In this case, search guidance matching the selected communication method is displayed.

As described above, in the fourth embodiment, when there are a plurality of communication methods, their communication states are acquired, and a communication method having a higher priority level is selected by the user. Therefore, the user can acquire wireless setting values by using an optimal communication method without being confused.

In addition, search guidance matching a communication method is displayed, and the user can know what to do next.

Also in the fourth embodiment, when wired connection is established, setting values are acquired by USB. This is because communication is stable when wired connection is used and there is a low possibility that the user may fail to acquire setting values.

As described above, according to the present invention, when wireless setting values are acquired from a different device, the user can smoothly configure the values without being confused.

Other Embodiments

Although the foregoing embodiments describe setting of a wireless LAN of a digital camera, what is set is not limited to the wireless LAN, and a device to be set is not limited to the digital camera. For example, instead of the digital camera 100, a device, such as a digital video player, an image viewing apparatus ("photo viewer"), or a cellular phone, may be used.

In addition, as described in the foregoing exemplary embodiments, main processing in each embodiment is realized such that each of programs installed in the personal computer 1300 and the printer 1400 is loaded into a CPU. Ordinarily, a computer program is made executable by setting a computer-readable recording medium, such as a compact-disk read-only memory, in a computer, and copying or installing the computer program in the system of the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-334316 filed Nov. 18, 2005 and No. 2006-125016 filed Apr. 28, 2006, which are hereby incorporated by reference herein in their entirety.

What is claimed is:

1. A communication apparatus capable of communicating with an external device by using a wired communicating unit or a wireless communicating unit, the communication apparatus comprising:
    a first determination unit configured to determine whether the communication apparatus is connected to the external device via a cable;
    a first acquisition unit configured to acquire parameters for wireless communication with the external device from the external device by wired communication, when the first determination unit determines that the communication apparatus is connected to the external device via the cable;
    a search unit configured to search for an external device by wireless communication, when the first determination unit determines that the communication apparatus is not connected to the external device via the cable;
    a display unit configured to display a selection screen for selecting a type of external device including at least one of a digital camera and a printer to be searched by the search unit, when the first determination unit determines that the communication apparatus is not connected to the external device via the cable;
    a selection receiving unit configured to receive the selected type of external device;
    a second acquisition unit configured to acquire parameters for wireless communication from the searched external device;
    a notifying unit configured to provide a notification urging a user to operate on the external device, the notification being provided in a different form based on the result of determination by the first determination unit and based on the selection received by the selection receiving unit, wherein the operation on the external device is for the first or second acquiring unit to acquire the parameters, and
    a transmission unit configured to transmit a request for acquiring the parameters to the external device by the wired communication,
    wherein the first acquisition unit is configured to acquire the parameters from the external device, to which the request is transmitted, and
    wherein the request includes an instruction for instructing the external device to activate an application for setting the parameters for the wireless communication.

2. The communication apparatus according to claim 1, further comprising:
    a registration unit configured to register the parameters acquired by the first or second acquisition unit; and
    a second determination unit configured to determine whether the registration unit can register new parameters,
    wherein, the notifying unit is configured to provide a notification indicating that the registration unit cannot register the new parameters, when the second determination unit determines that the registration unit cannot register new parameters.

3. The communication apparatus according to claim 2, wherein the notifying unit is configured to provide a notification urging a user to delete the parameter registered previously, when the second determination unit determines that the registration unit cannot register new parameters.

4. The communication apparatus according to claim 2, further comprising:
    a transmission unit configured to transmit a request for acquiring the parameters to the external device by the wired communication,
    wherein the first acquisition unit is configured to acquire the parameters from the external device, to which the request is transmitted,
    wherein the determination by the second determination unit is performed before the transmission unit transmits the request for acquiring the parameters.

5. The communication apparatus according to claim 1, wherein the notifying unit is configured to provide a notification for urging a user to configure the external device be capable of communicating by the wireless communication in a form based on the selected type of external device, when the selection receiving unit receives the selected type of external device.

6. A communication method for a communication apparatus to communicate with an external device by wired communication or wireless communication, the communication method comprising:
    a determination step of determining whether the communication apparatus is connected to the external device via a cable;
    a first acquisition step of acquiring parameters for wireless communication with the external device from the external device by wired communication, when it is determined that the communication apparatus is connected to the external device via the cable;
    a searching step of searching for the external device by wireless communication, when it is determined that the communication apparatus is not connected to the external device via the cable;
    a displaying step of displaying a selection screen for selecting a type of external device including at least one of a digital camera and a printer to be searched by the search unit, when the determination step determines that the communication apparatus is not connected to the external device via the cable;
    a selection receiving step of receiving the selected type of external device;
    a second acquisition step of acquiring parameters for wireless communication from the searched external device when it is determined that the communication apparatus is not connected to the external device via the cable; and
    a notifying step of providing a notification urging a user to operate on the external device, the notification being provided in a different form based on whether the communication apparatus is connected to the external device via the cable and based on the selection received at the selection receiving step, wherein the operation on the external device is for performing the first acquisition step or the second acquisition step, and a transmission step of transmitting a request for acquiring the parameters to the external device by the wired communication, wherein the first acquisition step acquires the parameters from the external device, to which the request is transmitted, and wherein the request includes an instruction for instructing the external device to activate an application for setting the parameters for the wireless communication.

7. A non-transitory computer-readable storage medium having stored thereon computer executable instructions comprising:

a determining step of determining whether a communication apparatus is connected to an external device via a cable;

a first acquisition step of acquiring parameters for wireless communication with the external device from the external device by wired communication, when it is determined that the communication apparatus is connected to the external device via the cable;

a searching step of searching for the external device by wireless communication, when it is determined that the communication apparatus is not connected to the external device via the cable;

a displaying step of displaying a selection screen for selecting a type of external device including at least one of a digital camera and a printer to be searched by the search unit, when the determination step determines that the communication apparatus is not connected to the external device via the cable;

a selection receiving step of receiving the selected type of external device;

a second acquisition step of acquiring parameters for wireless communication from the searched external device when it is determined that the communication apparatus is not connected to the external device via the cable;

a notifying step of providing a notification urging a user to operate on the external device, the notification being provided in a different form based on the whether the communication apparatus is connected to the external device via the cable and the selection received at the selection receiving step, wherein the operation on the external device is for performing the first acquisition step or the second acquisition step, and a transmission step of transmitting a request for acquiring the parameters to the external device by the wired communication, wherein the first acquisition step acquires the parameters from the external device, to which the request is transmitted, and wherein the request includes an instruction for instructing the external device to activate an application for setting the parameters for the wireless communication.

* * * * *